US008634871B2

(12) United States Patent
Mitsunaga

(10) Patent No.: US 8,634,871 B2
(45) Date of Patent: Jan. 21, 2014

(54) MOBILE ELECTRONIC DEVICE

(75) Inventor: Naoki Mitsunaga, Yokohama (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 13/578,359

(22) PCT Filed: Feb. 10, 2011

(86) PCT No.: PCT/JP2011/052935
§ 371 (c)(1),
(2), (4) Date: Aug. 10, 2012

(87) PCT Pub. No.: WO2011/099581
PCT Pub. Date: Aug. 18, 2011

(65) Prior Publication Data
US 2013/0012264 A1  Jan. 10, 2013

(30) Foreign Application Priority Data

Feb. 12, 2010  (JP) ................ 2010-029552
Feb. 12, 2010  (JP) ................ 2010-029553
Feb. 12, 2010  (JP) ................ 2010-029558

(51) Int. Cl.
*H04M 1/00*  (2006.01)
(52) U.S. Cl.
USPC ............ 455/556.1; 455/575.1; 455/550.1; 455/566; 345/173
(58) Field of Classification Search
USPC .......... 455/556.1, 575.1, 550.1, 566; 345/173; 715/846
See application file for complete search history.

(56) References Cited

U.S. PATENT DOCUMENTS

| | | | |
|---|---|---|---|
| 2001/0003707 A1 | 6/2001 | Moriya | |
| 2010/0064212 A1* | 3/2010 | Snyder | 715/700 |
| 2010/0173678 A1* | 7/2010 | Kim et al. | 455/566 |
| 2011/0134110 A1* | 6/2011 | Song et al. | 345/419 |
| 2011/0164042 A1* | 7/2011 | Chaudhri | 345/473 |
| 2012/0088548 A1* | 4/2012 | Yun et al. | 455/557 |

FOREIGN PATENT DOCUMENTS

| | | |
|---|---|---|
| JP | 9107570 A | 4/1997 |
| JP | 11068896 A | 3/1999 |
| JP | 3080147 U | 9/2001 |
| JP | 2001268186 A | 9/2001 |
| JP | 2002252476 A | 9/2002 |
| JP | 2003021836 A | 1/2003 |
| JP | 2008153937 A | 7/2008 |
| JP | 2009284468 A | 12/2009 |

OTHER PUBLICATIONS

International Search Report and Written Opinion for PCT/JP2011/052935, dated Mar. 8, 2011.

* cited by examiner

*Primary Examiner* — Danh Le
(74) *Attorney, Agent, or Firm* — Lowe Hauptman & Ham, LLP

(57) ABSTRACT

According to an aspect, a mobile electronic device includes: a housing that is made of a transparent material, and of which outer shape is formed with a first main face and a second main face paired with the first main face; a display unit that is arranged inside the housing and is configured to display images on both surfaces on the first main face side and the second main face side; a physical key that is formed with an opaque or a translucent material and is arranged on the first main face of the housing; and a circuit component that is arranged between the physical key and the display unit and is provided with a control unit that receives an input from the physical key and controls the display unit.

18 Claims, 22 Drawing Sheets

MOBILE ELECTRONIC DEVICE

CROSS-REFERENCE TO RELATED APPLICATION

This application is a National Stage of PCT international application Ser. No. PCT/JP2011/052935 filed on Feb. 10, 2011 which designates the United States, and which is based upon and claims the benefit of priority from Japanese Patent Application No. 2010-029552, filed on Feb. 12, 2010, Japanese Patent Application No. 2010-029553, filed on Feb. 12, 2010, and Japanese Patent Application No. 2010-029558, filed on Feb. 12, 2010.

FIELD

The present disclosure relates to a mobile electronic device with a display unit for displaying an image.

BACKGROUND

Recently, for mobile electronic devices with a display unit, such as a mobile phone, PDA, and a portable game machine, housings of various shapes and configurations are proposed (for example, Patent Literature 1). In addition, as the mobile electronic devices, mobile phones whose housing is made of a transparent material so that a circuit board and the like arranged inside thereof can be visually recognized have appeared on the market.

CITATION LIST

Patent Literature

Patent Literature 1: Japanese Patent Application Laid-Open No. 2002-252476

TECHNICAL PROBLEM

These mobile phones are only those of which the housing is made transparent as mere design characteristics, and are therefore not intended to provide any new operability.

For the foregoing reasons, there is a need for a mobile electronic device excellent in its aesthetic appearance and with high operability.

SUMMARY

According to an aspect, a mobile electronic device includes: a housing that is made of a transparent material, and of which outer shape is formed with a first main face, a second main face paired with the first main face, and a side face placed between the first main face and the second main face; a display unit that is arranged inside the housing and is configured to display images on both surfaces on the first main face side and the second main face side; a physical key that is formed with an opaque or a translucent material and is arranged on the first main face of the housing; and a circuit component that is arranged between the physical key and the display unit and is provided with a control unit that receives an input from the physical key and controls the display unit.

According to another aspect, at least part of the side face of the housing is inclined with respect to a direction perpendicular to the first main face.

According to another aspect, a surface of the physical key is covered with a sheet member.

According to another aspect, the mobile electronic device further includes: a speaker; a microphone; and a camera. The portion of at least one of the speaker, the microphone, the camera exposed from the housing is disposed between the display unit and the sheet member.

According to another aspect, the control unit controls the display unit such that, an image is displayed on the second main face side of the display unit, a background of an area that faces the circuit component is opaque and a background of an area that does not face the circuit component is transparent.

According to another aspect, the physical key is arranged closer to a lower side of the first main face based on a character display orientation when a character is displayed on the first main face side.

According to another aspect, the mobile electronic device further includes a touch sensor that is provided in the second main face and receives an input of an operation. The physical key is provided with at least one of a trackball, a direction key, a touch pad, and an optical pointing device.

According to another aspect, the mobile electronic device further includes a wireless communication unit that is provided with an antenna that transmits and receives radio waves and is configured to externally acquire information to be displayed on a screen. The antenna is disposed between the physical key and the display unit and at an edge in a lower side based on a character display orientation.

According to another aspect, the display unit has an image display area of the second main face larger than an image display area of the first main face.

According to another aspect, the display unit is made transparent or translucent when an image is not displayed thereon.

According to another aspect, the mobile electronic device further includes a power source that is disposed between the physical key and the display unit and can be charged in a noncontact manner.

According to another aspect, the display unit includes an image display area that is made transparent when an image is not displayed thereon, and the control unit displays an image based on at least one of a length, an angle, and an orientation in the image display area of the display unit.

According to another aspect, the control unit displays a ruler image in the image display area.

According to another aspect, the control unit stores a measurement result input when the ruler is displayed, and displays the input measurement result together with the ruler image therein.

According to another aspect, the mobile electronic device further includes: a location-information acquiring unit that acquires location information; and a direction specifying unit that specifies a direction to which the housing is directed. The control unit displays information for surroundings of the mobile electronic device located on the rear face side of the image display area in the image display area based on the location information acquired by the location-information acquiring unit and the direction specified by the direction specifying unit.

According to another aspect, the control unit displays the information, as a navigation image, for surrounding facilities of the mobile electronic device located on the rear face side of the image display area and overlapping on the image display area, in the image display area.

According to another aspect, when information for an actual size of a target object that is located on the rear face side of the image display area and a user can visually recognize through the image display area and information for a size of the target object, as an image, that overlaps on the image display area are input, the control unit calculates a distance between the target object and the mobile electronic device based on these pieces of information.

According to another aspect, the mobile electronic device further includes a turn-over detecting unit that detects a turn-over of the housing. The display unit includes a first display surface that can display an image on the first main face and a second display surface that can display an image on the second main face and has an area larger than that of the first display surface, and the control unit switches between a display of an image using the first display surface and a display of an image using the second display surface according to a detection result of the turn-over detecting unit.

According to another aspect, the control unit displays an image related to a use of the physical key on the first display surface.

According to another aspect, the image related to the use of the physical key is an image including a text box.

According to another aspect, the control unit displays an image including at least one of a Web browsing image, a map image, and an image photographed by a camera on the second display surface.

According to another aspect, the control unit displays a search input image, of images displayed on the second display surface, on the first display surface.

According to another aspect, when the turn-over detecting unit detects a turn-over of the housing during the display using the second display surface, the control unit displays an image input to the text box on the first display surface.

According to another aspect, when the turn-over detecting unit detects a turn-over of the housing during the display using the second display surface, the control unit attaches information displayed on the second display surface to mail.

According to another aspect, wherein, when the turn-over detecting unit detects a turn-over of the housing during the display using the second display surface, the control unit sets the physical key to an enabled state.

According to another aspect, wherein, when the turn-over detecting unit detects a turn-over of the housing during the display using the second display surface, the control unit displays a menu image for activating a predetermined application on the first display surface.

ADVANTAGEOUS EFFECTS OF INVENTION

The mobile electronic device according to the present invention has such advantageous effects that its aesthetic appearance is excellent and operability can be improved.

DESCRIPTION OF EMBODIMENTS

The present invention will be explained in detail below with reference to the drawings. It should be noted that the present invention is not limited by the following explanation. In addition, components in the description below encompass components that readily occur to those skilled in the art, that are substantially identical, or that fall into so-called equivalent ranges. In the followings, a mobile phone will be explained as an example of the mobile electronic device; however, a target to which the present invention is applied is not limited to the mobile phones. Therefore, the present invention is also applicable to, for example, PHSs (Personal Handyphone Systems), PDAs, portable navigation devices, and portable gaming devices.

Figure 1:
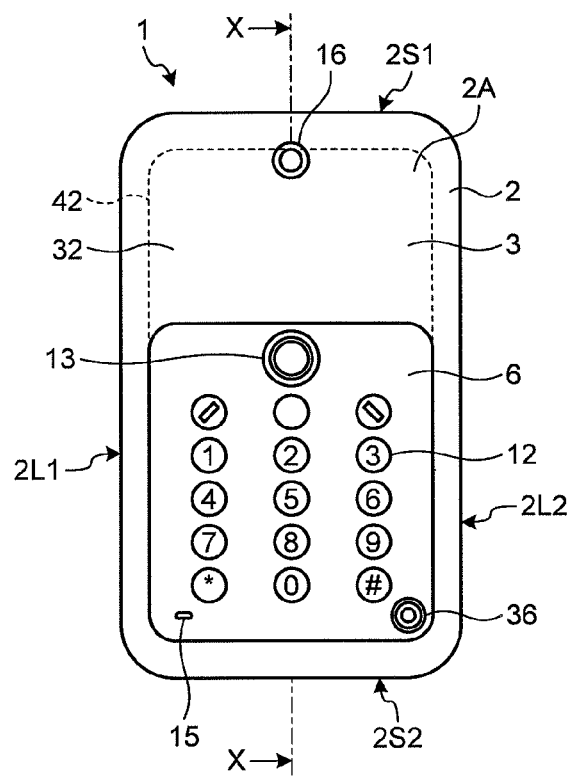
FIG. 1 is a front view of a schematic configuration of a mobile electronic device according to an embodiment of the present invention.
Figure 2:
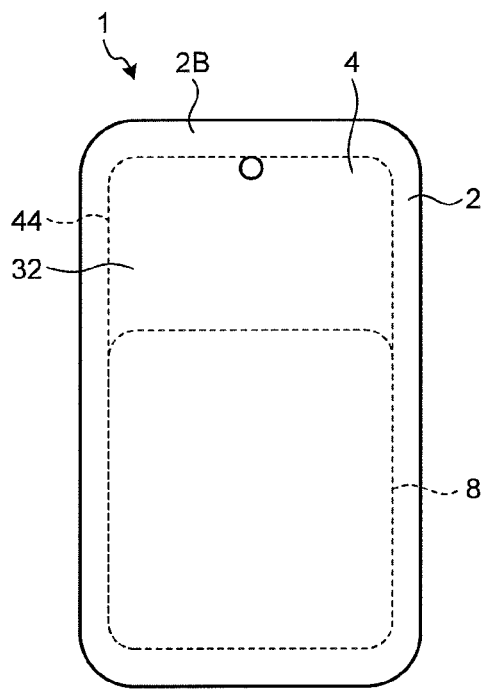
FIG. 2 is a rear view of the mobile electronic device illustrated in FIG. 1.
Figure 3:
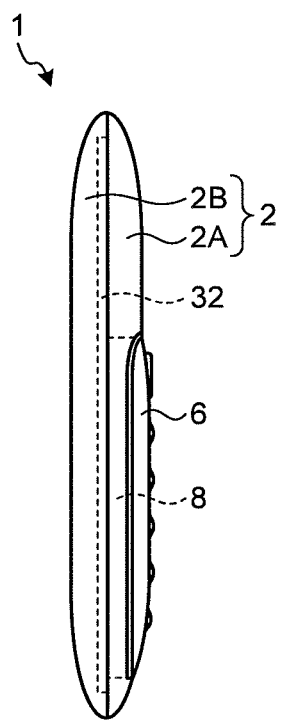
FIG. 3 is a side view of the mobile electronic device illustrated in FIG. 1.
Figure 4:
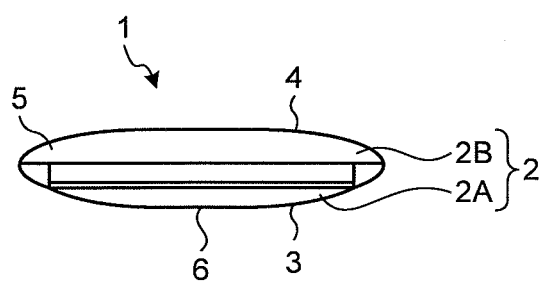
FIG. 4 is a top view of the mobile electronic device illustrated in FIG. 1.
Figure 5:
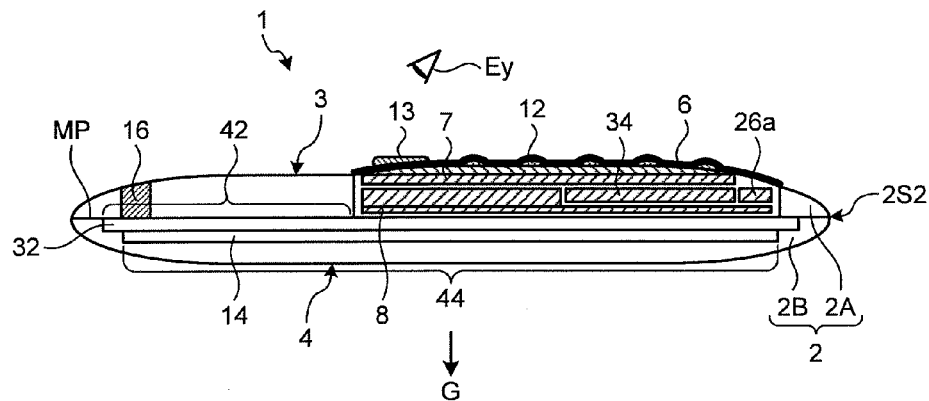
FIG. 5 is a X-X line cross-sectional view of the mobile electronic device illustrated in FIG. 1.

First, an external appearance of a mobile electronic device 1 is explained with reference to FIG. 1 to FIG. 5. FIG. 1 is a front view of a schematic configuration of the mobile electronic device according to an embodiment of the present invention. FIG. 2 is a rear view of the mobile electronic device illustrated in FIG. 1, FIG. 3 is a side view of the mobile electronic device illustrated in FIG. 1, FIG. 4 is a top view of the mobile electronic device illustrated in FIG. 1, and FIG. 5 is a X-X line cross-sectional view of the mobile electronic device illustrated in FIG. 1.

The mobile electronic device 1 is a mobile phone with a wireless communication function. The mobile electronic device 1 has a housing 2, and units are arranged in the inner side and on the surface of the housing 2. As illustrated from FIG. 1 to FIG. 4, the housing 2 has a box-shaped structure in which a first housing 2A and a second housing 2B are joined together. Each of the first housing 2A and the second housing 2B has a thin plate shape. That is, each of the first housing 2A and the second housing 2B is a rectangular plate structure in its planar view. The first housing 2A and the second housing 2B are joined together in a direction in which their respective faces with a largest area face each other. The faces with the largest areas of the first housing 2A and the second housing 2B have the same size as each other. The first housing 2A and the second housing 2B are joined together in the direction in which their faces with the largest areas face each other.

In the present embodiment, the housing 2, that is, the first housing 2A and the second housing 2B are made of a transparent material. The transparent material is a light transmitting material, such as PMMA (polymethyl methacrylate) resin and PC (polycarbonate). In the present embodiment, the first housing 2A and the second housing 2B are joined together with adhesive or so, and a joining surface MP illustrated in FIG. 5 is therefore transparent.

An outer surface of the housing 2 is formed with a front face (first main face, surface of the first housing 2A) 3, a rear face (second main face, back face, surface of the second housing 2B) 4 opposed to the front face 3 (opposite face), and a side face 5 between the front face 3 and the rear face 4. In the housing 2, the face of the first housing 2A with the largest area is the front face 3, and the face of the second housing 2B with the largest area is the rear face 4. The side face 5 is an outer edge of the front face 3 and the rear face 4, which is a side that can be seen when the housing 2 is viewed from a direction parallel to the front face 3 and the rear face 4, that is, a direction illustrated in FIG. 3 or FIG. 4. The housing 2 has a shape in which a space between the front face 3 and the rear face 4 is getting narrower according to directions from their center to both edges. That is, the housing 20 has a curved shape in a cross section of the side face 5 as illustrated in FIG. 3 and FIG. 4.

As illustrated in FIG. 1, the front face 3 of the housing 2 (first housing 2A) is provided with a sheet portion 6. The sheet portion 6 is arranged offset closer to the lower side than its center (which is an orientation being the lower side based on a character display orientation or so when normally used) in a long-side direction of the front face 3. That is, the sheet portion 6 is arranged offset closer to one of the short-side direction sides of the front face 3 than the center in the long-side direction. Namely, the sheet portion 6 is arranged so as to be shifted to the lower side of the front face 3 (to the one of the short-side direction sides). The sheet portion 6 is arranged substantially over the whole area of the front face 3 in the short-side direction of the housing 2. The sheet portion 6 is made of an opaque material. In addition, the sheet portion 6 is flexible and deforms when being pressed.

The sheet portion 6 includes a numeric keypad 12, a direction and decision key 13, a microphone 15, and a camera 36. The numeric keypad 12 is arranged in the center of the sheet portion 6. The numeric keypad 12 is keys used to input numbers at the time of entering a phone number and to input characters at the time of composing mail. The direction and decision key 13 is a key used to easily execute selection and decision of a menu displayed on a first display surface (first screen) 42 illustrated in FIG. 5 and also scroll of the screen, and is disposed closer to an outer edge of the sheet portion 6 (upper side thereof in FIG. 1) than the numeric keypad 12 of the sheet portion 6.

A receiver 16 emits sounds during a phone call using the mobile electronic device 1. The receiver 16 is disposed on a short side 2S1 side of the housing 2 with a certain distance from the outer edge of the sheet portion 6. The microphone 15 receives sounds during a phone call using the mobile electronic device 1. The microphone 15 is disposed on the other short side 2S2 side and on a long side 2L1 side of the housing 2. The camera 36 has a photograph window disposed on the other short side 2S2 side and on the other long side 2L2 side of the housing 2.

As illustrated in FIG. 5, an operation board 7, a circuit board 8, a touch panel 14, an antenna 26a, a display unit 32, and a battery 34 are arranged inside of the housing 2. The operation board 7 is a board arranged so as to face the numeric keypad 12 and the direction and decision key 13. The operation board 7 includes a detection circuit that detects an operation input to the numeric keypad 12 or to the direction and decision key 13 and a circuit that sends the detected input to a main control unit 22 explained later.

The circuit board 8 is a board on which electronic components having functions such as the main control unit 22 and a storage unit 24 explained later, for example, an MPU (Micro Processing Unit) and a memory are disposed, and is arranged closer to the rear face 4 side than the operation board 7. The circuit board 8 is formed with, for example, two boards laminated in a thickness direction of the housing 2, in which the board arranged in the rear face 4 side has an area larger than that of the board on the front face 3 side. The circuit board 8 is provided in an area where the sheet portion 6 is arranged when the housing 2 is viewed from the direction perpendicular to the front face 3. In addition, the circuit board 8 is provided with a thick circuit member in a part thereof on the direction and decision key 13 side. That is, a part of the circuit board 8 on the direction and decision key 13 side is formed to be thicker than the other part, that is, a part thereof on the microphone 15 side.

The antenna 26a is disposed on the other short side 2S2 side of the housing 2 toward the short-side direction thereof (i.e., toward the direction parallel to the short side 2S1). That is, the antenna 26a is disposed so as to extend in the short-side direction along an edge (edge on the side far from the receiver 16) on the side where the microphone 15 is disposed in the long-side direction of the housing 2. The antenna 26a is disposed between the operation board 7 and the circuit board 8 arranged in the rear face 4 side in the thickness direction of the housing 2. In addition, the antenna 26a is disposed in the area where the sheet portion 6 is arranged on a plane parallel to the front face 3. The battery 34 is disposed on the rear face 4 side of the operation board 7 and on the front face 3 side of the circuit board 8, that is, between the operation board 7 and the circuit board 8. The battery 34 faces a thin area of the circuit board 8 and is disposed closer to the circuit board 8 side of the front face 3 side than the antenna 26a in the long-side direction of the housing 2.

The display unit 32 is disposed closer to the rear face 4 side than the circuit board 8 of the housing 2. As illustrated in FIG. 1, FIG. 2, and FIG. 5, the display unit 32 is a sheet member placed on most of an area of the rear face 4 in both the long-side direction and the short-side direction of the housing 2. The display unit 32 displays a certain image, for example, a standby image when the mobile electronic device 1 awaits reception and displays a menu image used to assist the operations of the mobile electronic device 1. In the present embodiment, the display unit 32 is a transparent display device (e.g., transparent liquid crystal panel), and therefore the other side can be seen therethrough. That is, the display unit 32 allows the light incident from the outside of the housing 2 to pass therethrough and to be emitted to the outside thereof.

Because the display unit 32 is the transparent display device, a displayed image can be visually recognized from both sides on the front face 3 side and the rear face 4 side. As for the display unit 32, an area not covered with the sheet portion 6 on the front face 3 side is the first display surface (first screen) 42, and the whole area on the rear face 4 side is a second display surface (second screen) 44. Namely, the mobile electronic device 1 uses the area not covered with the sheet portion 6, as the first display surface 42, of the face on the front face 3 side of the display unit 32, and uses the whole area, as the second display surface 44, of the face on the rear face 4 side of the display unit 32. In the following, when the first display surface 42 is not discriminated from the second display surface 44, the display surface is called "screen" as required. An image displayed on the first display surface 42 can be visually recognized through the first housing 2A, and an image displayed on the second display surface 44 can be visually recognized through the second housing 2B. In the present embodiment, the sum of the area of the sheet portion 6 and the area of the first display surface 42 is substantially equal to the area of the second display surface 44. Therefore, the area of the second display surface 44 is larger than the first display surface 42. In this way the mobile electronic device 1 has the first display surface 42 capable of displaying an image on a certain face (front face 3) side of the housing 2 and the second display surface 44 capable of displaying an image on the side of the rear side of the certain face, that is, on the rear face 4 side and whose area is larger than that of the first display surface 42. Thus, the mobile electronic device 1 uses, as the display unit 32, the first display surface 42 visually recognizable from the front face 3 side and the second display surface 44 visually recognizable from the rear face 4 side by displaying images on both of them.

In the area that serves as the first display surface 42 and the second display surface 44 of the display unit 32, the members laminated in the thickness direction are basically transparent. Therefore, the area that serves as the first display surface 42 and the second display surface 44, allows the other side to be viewed therethrough, that is, has transparency, when viewed from the outside of the housing 2. The circuit board 8 and the like are arranged on the front face 3 side of the area that only serves as the second display surface 44 of the display unit 32. Therefore, by keeping the display unit 32 transparent, the circuit board 8 can be seen from the rear face 4 side.

The touch panel (touch sensor) 14 is arranged on the face on the rear face 4 side of the display unit 32. The touch panel 14 is a detector that detects a user's operation input from the rear face 4 side, and detects which part of the touch panel 14 is specified. The touch panel 14 is transparent in an area facing the display unit 32.

Figure 6:
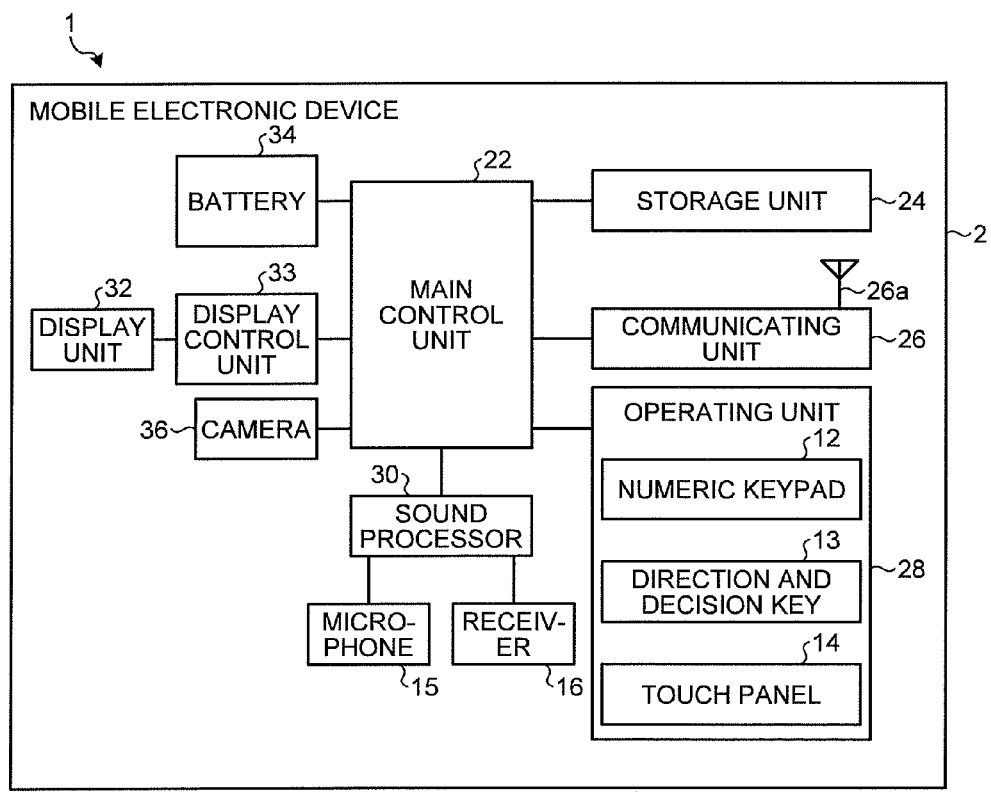
FIG. 6 is a block diagram of a schematic configuration of functions of the mobile electronic device illustrated in FIG. 1.

A relation between functions and a control unit of the mobile electronic device 1 is explained below. FIG. 6 is a block diagram of a schematic configuration of functions of the mobile electronic device illustrated in FIG. 1. As illustrated in FIG. 6, the mobile electronic device 1 includes the main control unit 22, the storage unit 24, a communicating unit 26, an operating unit 28, a sound processor 30, the display unit 32, a display control unit 33, the battery 34, and the camera 36.

The main control unit 22 is a processor, for example, CPU (Central Processing Unit) that integrally controls entire operations of the mobile electronic device 1. That is, the main control unit 22 controls the operations of the communicating unit 26, the display unit 32, and the like so that various processes of the mobile electronic device 1 are executed in an appropriate procedure according to an operation of the operating unit 28 and software stored in the storage unit 24 of the mobile electronic device 1. The main control unit 22 executes the processes based on programs (e.g., an operating system program and application programs) stored in the storage unit 24.

The storage unit 24 stores therein software and data used for processes executed by the main control unit 22. For example, the storage unit 24 stores therein a program that controls an image to be displayed on the display unit 32 and a program to execute transmission and reception of mails. Furthermore, the storage unit 24 stores therein various data other than the programs. For example, the storage unit 24 stores therein various setting conditions, an address book, dictionary data used for character conversion, image data photographed by the camera (reader) 36, and the like.

The communicating unit 26 establishes a wireless signal path, through the antenna 26a, using a CDMA system or so between the communicating unit 26 and a base station via a channel assigned by the base station, and performs telephone communication and information communication between the communicating unit 26 and the base station.

The operating unit 28 includes the numeric keypad 12 assigned with various functions such as a power key, a talk key, numeric keys, character keys, direction keys, a decision key, and a send key; the direction and decision key 13; and the touch panel 14. When any of the keys or the touch panel 14 receives an input through a user's operation, the operating unit 28 inputs the detail of the operation to the main control unit 22.

The sound processor 30 processes a sound signal input to the microphone 15 and a sound signal output from the receiver 16.

The display unit 32 is, as explained above, the transparent display device, and causes the display device to video a picture according to video data and an image according to image data supplied from the main control unit 22 via the display control unit 33.

The battery 34 is a source of power that supplies power to each unit of the mobile electronic device 1 such as the main control unit 22. The camera 36 is an imaging system that captures an image of a photographing area (an area included in a view angle at a certain angle) facing the front face 3. The camera 36 sends a photographed image to the main control unit 22.

In this way, in the mobile electronic device 1, the operation board 7, the circuit board 8, the antenna 26a, and the battery 34 are arranged in the area sandwiched by the numeric keypad 12/the direction and decision key 13 and the display unit 32, that is, in the area between the sheet portion 6 and the display unit 32. Therefore, it is configured in the present embodiment that the operation board 7, the circuit board 8, the antenna 26a, and the battery 34 are not visible underneath the sheet portion 6 when the mobile electronic device 1 is viewed from the front face 3 side of the housing 2.

The side face 5 of the housing 2 is formed into a curved shape while the thickness of a resin material (transparent material) itself on the side face 5 of the housing 2 is sufficiently secured, so that the circuit board 8 cannot be seen even if someone looks into the inner side of the housing 2 from the side of the side face 5 with an intention of looking at the circuit board 8. Namely, it is configured that the light incident from the side face 5 of the housing 2 does not reach the circuit board 8 by making thick the resin material on the side face 5, forming the side face 5 into the curved shape, and refracting the light incident from the side face 5.

Furthermore, the mobile electronic device 1 is provided with the display unit 32 on the rear face 4 side of the housing 2. This enables the mobile electronic device 1 to be configured so that the circuit board 8 cannot be seen also from the rear face 4 side by displaying an image on the display unit 32.

In this way, the mobile electronic device 1 allows the electronic components such as the circuit board 8 to be invisible even if the housing 2 is made transparent, so that an excellent aesthetic appearance can be obtained. Moreover, the various keys such as the numeric keypad 12 and the direction and decision key 13 can be arranged, so that the operation can be performed easily.

By providing the first display surface 42 on the front face 3 side where the numeric keypad 12 and the direction and decision key 13 are arranged, the operation screen can be displayed on the first display surface 42. In addition, by providing the second display surface 44 which is larger than the other on the rear face 4 side, an image can be displayed on a large screen. By providing the transparent display device for the display unit 32, images can be displayed on both the first display surface 42 and the second display surface 44 with the single display unit 32. By determining (selecting) an image to be displayed using the display surfaces, an appropriate image can be displayed. Namely, the main control unit 22 and the display control unit 33 provide controls so that an appropriate image can be displayed on the display surface used. The mobile electronic device 1 has the numeric keypad 12, the direction and decision key 13, and the first surface portion 42 with a small display area on the front face 3, and has the touch panel 14 and the second display surface 44 with a large display area on the rear face 4. This enables the front face 3 and the rear face 4 to be used differently according to how to use the mobile electronic device 1. For example, it can be configured that operations with many inputs of numbers and characters for a mail or so are performed on the front face 3, and that appreciation and operations of a moving image and images in which enlargement of the screen and selection is a main operation are performed on the rear face 4. Thus, the operability can be improved.

By providing the opaque sheet portion 6 on the face where physical keys (keys which are fixed to predetermined positions and are not made of the transparent sheet material like the touch panel 14) such as the numeric keypad 12 and the direction and decision key 13 of the housing 2 are arranged, the circuit board 8 can be more reliably hidden. Because such an effect can be obtained, the sheet portion 6 is preferably made opaque; however, the sheet portion 6 is not limited thereto, that is, it may be translucent. By making the sheet portion 6 translucent, the circuit board 8 can be made difficult to see. By making the sheet portion 6 difficult to see, the aesthetic appearance can be improved more than a certain level. In addition, the sheet portion 6 is preferably arranged so as to cover the surface of the numeric keypad 12 as explained in the present embodiment. This allows the external appearance of the surface of the numeric keypad 12 to be like a single sheet, so that a shape excellent in the aesthetic appearance can be achieved. Moreover, because the space between the keys and the housing 2 is not exposed, a waterproof property can be improved, and the structure of the housing 2 becomes simple.

Because the circuit board 8 is hidden, the sheet portion 6 is preferably provided; however, the present invention is not limited thereto, and therefore the sheet portion 6 does not have to be provided. By providing the circuit board 8 in a location corresponding to (location that faces) the physical keys such as the direction and decision key 13, the physical keys can hide the circuit board 8 without the sheet portion 6. The physical keys are uneven in height, are printed with characters of corresponding functions, and are divided into a plurality of keys, and therefore the rear side thereof is made difficult to see. This can make the circuit board 8 difficult to see.

The physical keys are preferably made opaque. Moreover, it is preferable that a portion forming the physical keys be formed with an opaque material. This can make the circuit board 8 difficult to see.

As illustrated in the mobile electronic device 1, it is also preferable that the battery 34 and the antenna 26a, in addition to the circuit board 8, be arranged between the physical keys and the display unit 32. This can also make the battery 34 and the antenna 26a difficult to see. The antenna 26a is preferably provided at an edge of the housing 2, and it is particularly preferable that the antenna 26a be provided at a lower edge of the housing 2 (at an edge in the lower side based on the character display orientation). By providing the antenna 26a at the edge, the sensitivity can be improved while suppressing the other devices from being affected. Moreover, by providing the antenna 26a at the lower edge of the housing 2, the antenna 26a can be disposed at a location where it could be easily exposed even when the user holds the housing 2, thus maintaining high sensitivity.

As illustrated in the mobile electronic device 1, by arranging the physical keys offset to the lower side than the center in the long-side direction of the housing 2 (namely, closer to the lower side of the first main face based on the character display orientation when a character is displayed on the first main face), the physical keys and the first display surface 42 can be arranged at locations where they can be easily operated. Namely, when the physical keys are operated, the first display surface 42 is provided above the physical keys, which allows the user to easily perform operations while looking at the first display surface 42.

In the present embodiment, the device for inputting an operation by pressing the numeric keypad 12 or by pressing the direction and decision key 13 is provided as the physical key on the front face 3; however, the present invention is not limited thereto. The physical key is an input unit except for the touch panel 14, and may be provided with a trackball, a direction key, a touch pad, and an optical pointing device as well as the numeric keypad 12 and the direction and decision key 13. The mobile electronic device 1 has only to be provided with at least one of these physical keys on the front face 3. It is preferable that the touch panel 14 be provided on the rear face 4 as explained in the present embodiment. This enables the user to input the operation even when an image is displayed on the second display surface 44 of the rear face 4, thus improving the operability.

As explained in the present embodiment, by providing, in addition to the physical keys, the microphone 15 and the camera 36 in the sheet portion 6, a transparent portion of the housing 2 can be made broader and the aesthetic appearance of the device can be more improved. The device provided in the sheet portion 6 is not limited to the microphone and the camera, and a member of which opaque portion is exposed from the housing 2, such as a receiver and a speaker, is preferably disposed in the sheet portion 6. It is preferable that the members of which opaque portions are exposed from the housing 2 be disposed in the sheet portion 6 in order to improve the aesthetic appearance; however, all of them are not necessarily disposed therein, and therefore at least one of them is preferably disposed therein.

Figure 7:
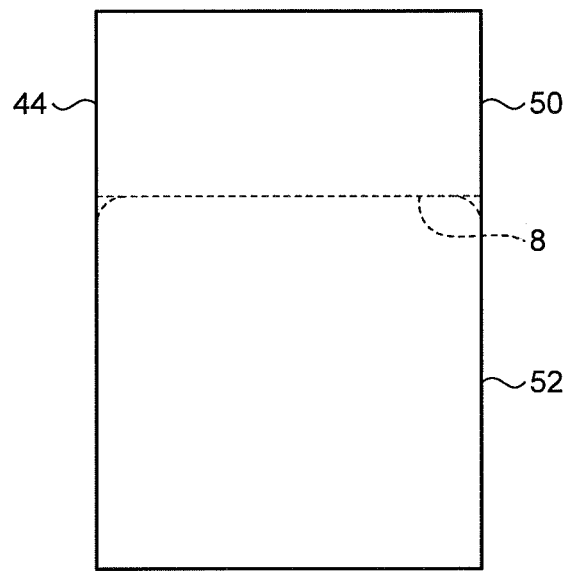
FIG. 7 is an explanatory diagram of a screen of a display unit of the mobile electronic device.
Figure 8:
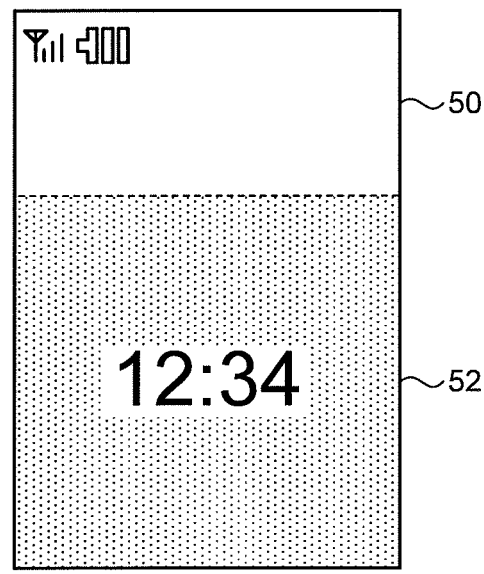
FIG. 8 is an explanatory diagram of an example of an image displayed on the display unit.
Figure 9:
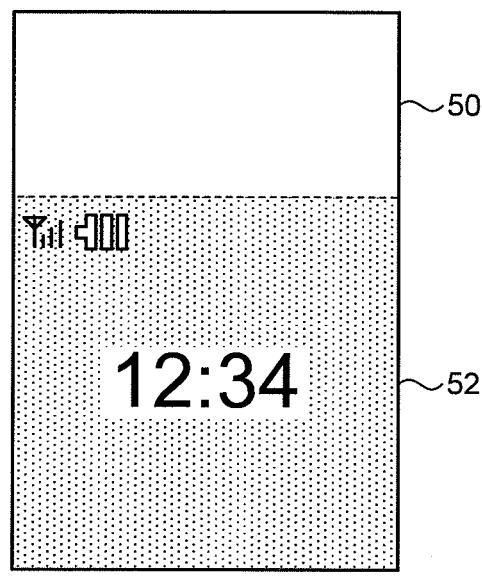
FIG. 9 is an explanatory diagram of an example of an image displayed on the display unit.
Figure 10:
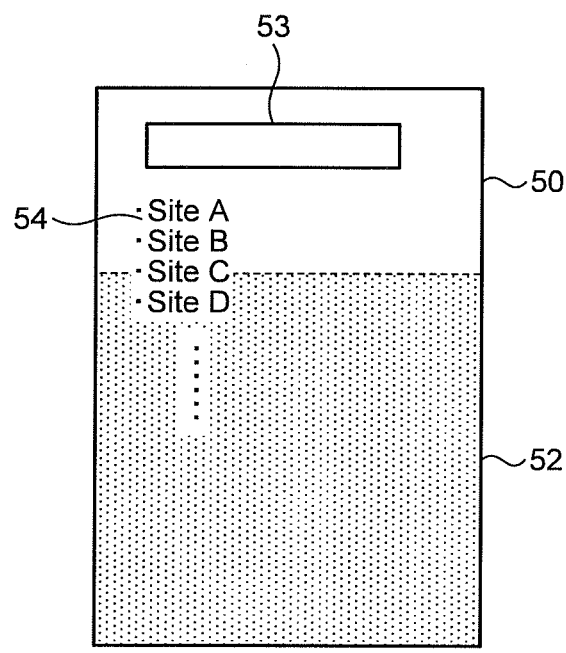
FIG. 10 is an explanatory diagram of an example of an image displayed on the display unit.

For the mobile electronic device 1, it is preferable to switch the setting of an image displayed on the second display surface 44 between an area that faces the circuit board 8 and an area that does not face the circuit board 8. Namely, it is preferable to perform different display controls between an area including the first display surface 42 and the second display surface 44 and an area only including the second display surface 44, of the display unit 32. This is explained below with reference to FIG. 7 to FIG. 10. FIG. 7 is an explanatory diagram of a screen of the display unit of the mobile electronic device. FIG. 8 to FIG. 10 are explanatory diagrams of examples of respective images displayed on the display unit.

First, as illustrated in FIG. 7, when an image is not displayed on the second display surface 44 of the mobile electronic device 1, a first display area 50 is transparent and a sight on the opposite side of the housing 2 can be seen through the first display area 50, and the circuit board 8 can be seen in a second display area 52. The first display area 50 is an area that serves as the first display surface 42 and the second display surface 44, and the second display surface 44 is an area that only serves as the second display surface 44.

As illustrated in FIG. 8, when the standby screen is displayed, the main control unit 22 makes the background of the first display area 50 transparent, and makes the background of the second display area 52 opaque. In this way, by making the second display area 52 opaque, that is, by displaying some image therein, the first display area 50 can be set to a transparent state while keeping the circuit board 8 on the rear face 4 of the second display area 52 invisible. Thus, it is possible to suppress the circuit board 8 from being visible while making use of the transparent aesthetic appearance of the mobile electronic device 1.

As illustrated in FIG. 8, when the standby screen is displayed, the backgrounds are switched to one other between the first display area 50 and the second display area 52; however, images to be displayed may be switched to one other. Specifically, as illustrated in FIG. 9, when the standby screen is displayed, an image may be displayed only in the second display area 52, and no image may be displayed in the first display area 50. Even in this way, it is possible to suppress the circuit board 8 from being visible while maintaining the first display area 50 transparent. The main control unit 22 may preferentially display an image in the second display area 52 and may display an image in the first display area 50 when the image displayed becomes a certain size. Even in this case, the background (wallpaper) is preferably transparent.

The case of the standby screen has been explained with reference to FIG. 8 and FIG. 9; however, in a case of displaying an operation screen of any other application and an image, it is also preferable that the background of the first display area 50 be made transparent and the background of the second display area 52 be made opaque. For example, when a browser is used and a screen as a result of search is displayed, as illustrated in FIG. 10, the main control unit 22 displays a search box 53 for displaying a search keyword and textual information 54 indicating search results on the second display surface 44. In addition, the main control unit 22 makes transparent the background of the first display area 50 of the second display surface 44 and makes opaque the background of the second display area 52 thereof. In this way the search box 53 and the textual information 54 displayed in the first display area 50 are displayed as if they float above the transparent background, and the textual information 54 displayed in the second display area 52 are displayed on the opaque background. Thus, even when screens of various applications are to be displayed, images can be displayed while making use of the aesthetic appearance of the transparent mobile electronic device 1.

In any of the embodiments, the wallpaper as the background displayed in the first display area 50 is made transparent; however, the background is not limited thereto. The main control unit 22 displays only an image required for displaying the information (image), and simply makes other image elements as the background transparent in the first display area 50 instead of displaying them. For example, when textual information is to be displayed, only textual information is displayed, and other images are simply prevented from being displayed.

The side face 5 of the housing 2 of the mobile electronic device 1 is formed into a curved surface in the embodiment; however, the present invention is not limited thereto. As for the side face 5 of the housing 2, it is preferable that the circuit board 8 inside the housing 2 cannot be seen (cannot be recognized) or the circuit board 8 can be made difficult to see when the housing 2 is viewed from the direction parallel to the front face 3 and the rear face 4, and that at least part of the side face 5 be inclined with respect to the direction perpendicular to the front face 3. In this manner, by forming at least part of the side face 5 into a shape inclined with respect to the direction perpendicular to the front face 3, that is, into a shape that is not a planar shape perpendicular to the front face 3, the circuit board 8 inside the housing 2 cannot be seen (cannot be recognized), or the circuit board 8 can be made difficult to see.

Figure 11:
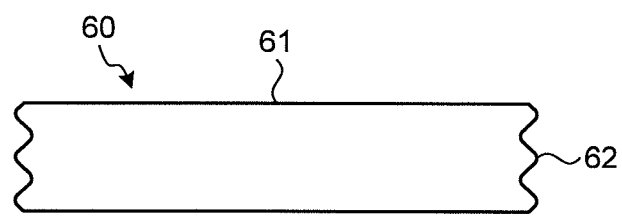
FIG. 11 is a top view of a schematic configuration of another example of the mobile electronic device.
Figure 12:
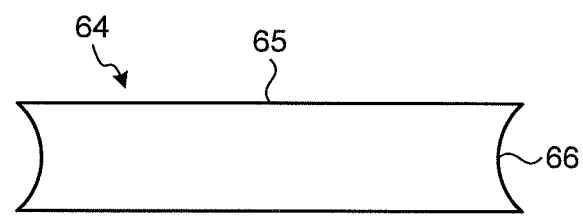
FIG. 12 is a top view of a schematic configuration of still another example of the mobile electronic device.
Figure 13:
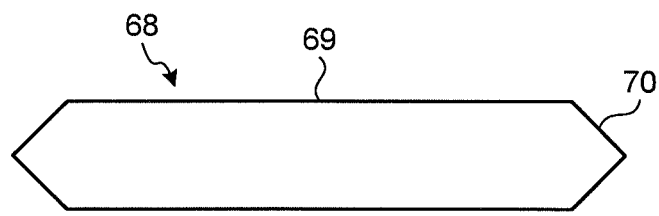
FIG. 13 is a top view of a schematic configuration of still another example of the mobile electronic device.

FIG. 11 to FIG. 13 are top views of a schematic configuration of other examples of the mobile electronic device. In a mobile electronic device 60 illustrated in FIG. 11, a side face 62 of a housing 61 has a waveform shape. In this way, by forming the side face 62 into the waveform shape, the inner side of the housing 61 can be made difficult to see from the side face 62. In a mobile electronic device 64 illustrated in FIG. 12, a side face 66 of a housing 65 is a curved face being convex toward the center of the housing 65. In this way, by forming the side face 66 into the curved face being convex toward the center of the housing 65, the inner side of the housing 64 can be also made difficult to see from the side face 66. In a mobile electronic device 68 illustrated in FIG. 13, a side face 70 of a housing 69 is formed with two slopes that are inclined in directions separating from the center of the housing 69 with respect to the direction perpendicular to the front face 3. In this way, by combining shapes whose cross section is a straight line to form the side face 70, the inner side of the housing 68 can also be made difficult to see from the side face 70.

In this way the circuit board can be made difficult to see or can be made invisible, and therefore at least part of the side face is preferably inclined with respect to the direction perpendicular to the front face 3; however, the side face may be formed with a face perpendicular to the front face 3. In the mobile electronic device, it is also preferable that only the side face in a horizontal direction (side face along the side of its long side) of the side face is formed into an inclined shape with respect to the direction perpendicular to the front face 3. Moreover, it is also preferable that part of the side face that faces the circuit board is formed into an inclined shape with respect to the direction perpendicular to the front face 3. In this manner, it is structured so that, of the side face, only a portion where the circuit board can be easily seen and only a portion close to the circuit board are made difficult to see, thus improving the aesthetic appearance of the mobile electronic device.

In the present embodiment, the housing 2 is divided into the first housing 2A on the front face 3 side and the second housing 2B on the rear face 4 side; however, the configuration of the housing is not limited thereto. For example, the housing may be formed with a single member, or may be structured so as to be vertically divided. In addition, the housing may be structured with a box whose one face is opened and a cover that covers the opened face of the box. Furthermore, the housing may be structured with three or more members joined to each other. To improve the aesthetic appearance, it is preferable in any case that the joining surface be joined with adhesive or the like so that the joining surface can be made transparent.

In the mobile electronic device 1, the battery is preferably a battery that can be charged in a noncontact manner, for example, an electromagnetic induction type battery. By charging the battery in a noncontact manner, there is no need to provide a terminal for charging in the housing 2, thus further improving the aesthetic appearance of the housing 2. Moreover, the mobile electronic device can be easily made to a highly waterproof one.

The mobile electronic device 1 preferably performs data communication wirelessly with other devices, for example, using infrared communication and Bluetooth. This eliminates the need for a terminal for data communication, thus further improving the aesthetic appearance of the housing 2. Moreover, the mobile electronic device can be easily made to a highly waterproof one.

In the present embodiment, the display unit 32 is transparent when an image is not displayed; however, the display unit 32 may be translucent. Even if the display unit 32 is translucent, the other side of the housing 2 is visible through it, thus improving the aesthetic appearance of the device. Moreover, in the present embodiment, because the device structure becomes simple, the display unit 32 is formed with a sheet of display device; however, it may be formed with two sheets of display device. Namely, the first display surface and the second display surface may be provided with different display devices.

By making the housing 2 using a transparent material as explained in the present embodiment, the mobile electronic device 1 with an external appearance excellent in aesthetic appearance can be provided. The housing 2 of the mobile electronic device 1 is not necessarily made of a transparent material, and may therefore be made of an opaque material.

Figure 14:
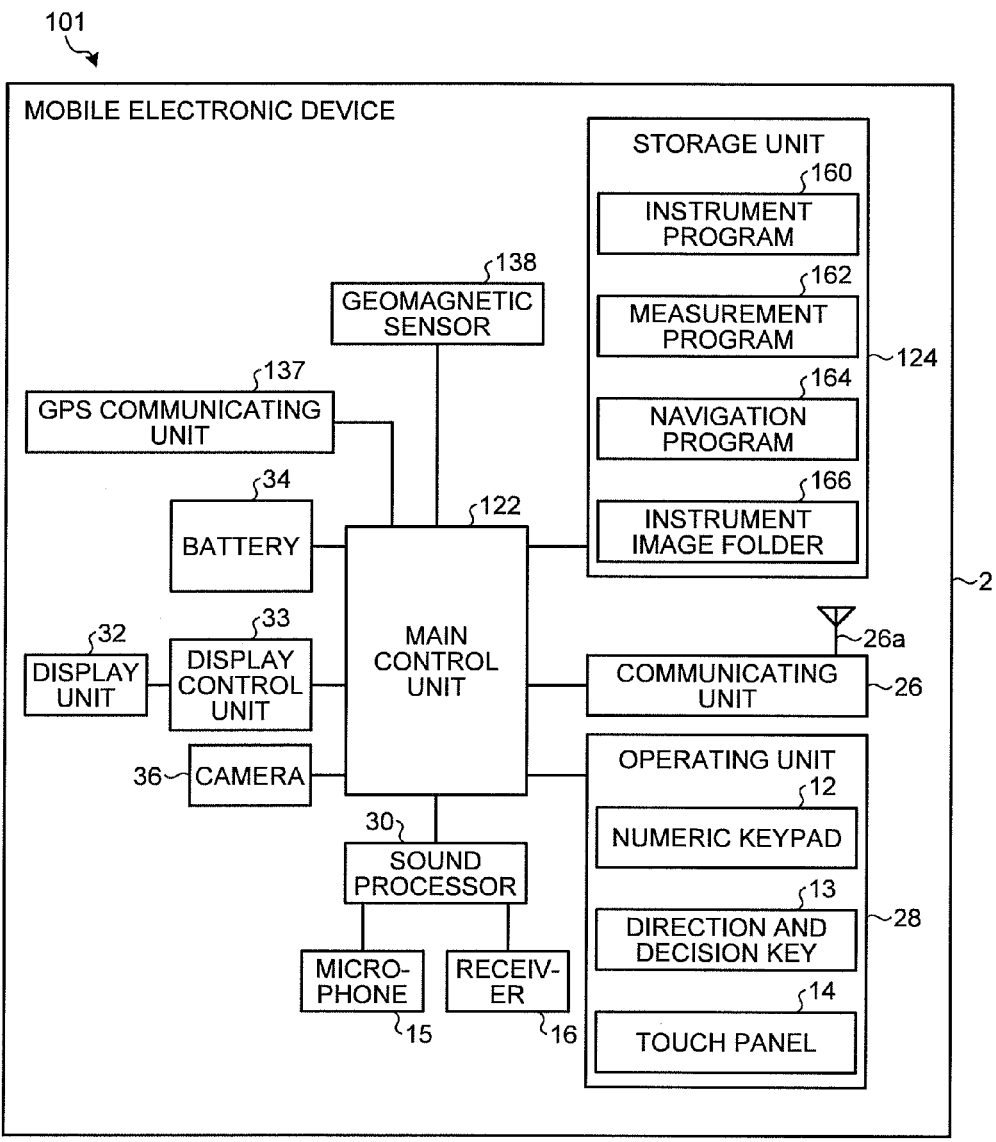
FIG. 14 is a block diagram of a schematic configuration of functions of a mobile electronic device according to another embodiment.

A mobile electronic device according to another embodiment is explained with reference to FIG. 14 to FIG. 23. Because a mobile electronic device 101 of the present embodiment has a shape of external appearance similar to that of the mobile electronic device 1 illustrated in FIG. 1 to FIG. 5, explanation thereof is omitted. A relation between functions and a control unit of the mobile electronic device 101 is explained with reference to FIG. 14. FIG. 14 is a block diagram of a schematic configuration of functions of the mobile electronic device according to another embodiment. The mobile electronic device 101 as illustrated in FIG. 14 includes a main control unit 122, a storage unit 124, the communicating unit 26, the operating unit 28, the sound processor 30, the display unit 32, the display control unit 33, the battery 34, the camera 36, a GPS communicating unit 137, and a geomagnetic sensor 138. The communicating unit 26, the operating unit 28, the sound processor 30, the display unit 32, the display control unit 33, the battery 34, and the camera 36 are the same as those of the mobile electronic device 1, and therefore explanation thereof is omitted.

The main control unit 122 is a processor, for example, CPU (Central Processing Unit) that integrally controls entire operations of the mobile electronic device 101. The main control unit 122 executes the processes based on the programs (e.g., an operating system program, and application programs) stored in the storage unit 124.

The storage unit 124 stores therein software and data used for processes executed by the main control unit 122, specifically, an instrument program 160, a measurement program 162, a navigation program 164, and an instrument image folder 166. The instrument program 160 is an application program for displaying an instrument on the display unit 32. The measurement program 162 is an application program for measuring (calculating) a distance to a target object or for measuring (calculating) a size of the target object or a distance to the target object. The navigation program 164 is an application program for notifying the user of guidance information. The instrument image folder 166 is an image folder having a plurality of instruments displayed upon execution of the instrument program 160. Applications for processing and executing the instrument program 160, the measurement program 162, and the navigation program 164 will be explained later.

The storage unit 124 stores therein a program that controls an image to be displayed on the display unit 32 and a program to execute transmission and reception of mails. Furthermore, the storage unit 124 stores therein various data other than the programs, for example, in addition to the instrument image folder 166, various setting conditions, map information used for an navigation application, an address book, dictionary data used for character conversion, image data photographed by the camera (reader) 36, and the like.

The GPS communicating unit 137 is a communicating unit that receives GPS signals emitted from a GPS (Global Positioning System) satellite. The GPS communicating unit 137 calculates a latitude and a longitude of the mobile electronic device 101 from the received GPS signals, and transmits information for the calculated latitude and longitude to the main control unit 122. The main control unit 122 can detect a position of the mobile electronic device 101 by the information transmitted from the GPS communicating unit 137.

The geomagnetic sensor 138 is a detector that detects an orientation of geomagnetism in three directions orthogonal to one another. As the detector that detects geomagnetism, a Hall element, an MR element, an MI element, a fluxgate element, or the like can be used. The geomagnetic sensor 138 transmits detection results of the orientation of the geomagnetism in the detected three directions to the main control unit 122. The main control unit 122 can detect the orientation (direction) of the mobile electronic device 101 using the detection results of the geomagnetic sensor 138.

Figure 15:
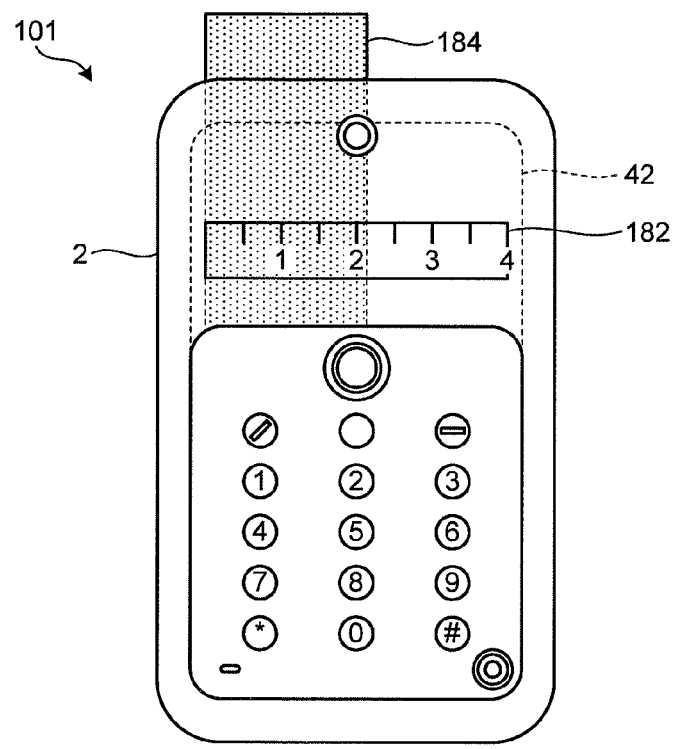
FIG. 15 is an explanatory diagram for explaining an operation of the mobile electronic device.
Figure 16:
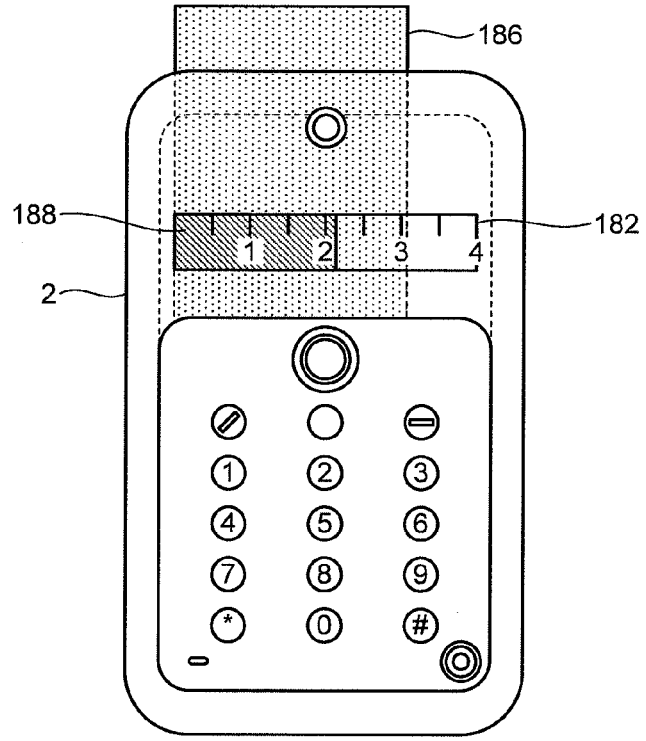
FIG. 16 is an explanatory diagram for explaining an operation of the mobile electronic device.

An operation of the mobile electronic device 101, specifically, an operation performed when the instrument program 160 is executed is explained with reference to FIG. 15 and FIG. 16. FIG. 15 and FIG. 16 are explanatory diagrams for explaining operations of the mobile electronic device. FIG. 15 and FIG. 16 represent a case where the front face 3 of the housing 2 faces the user and an image is displayed on the first display surface 42.

First, when an activation instruction of an application for displaying an instrument is input from the user, the mobile electronic device 101 causes the main control unit 122 to process the instrument program 160 stored in the storage unit 124, to activate the corresponding application. After the activation of the application, the main control unit 122 reads an image from the instrument image folder 166, an image of a ruler (an instrument for measuring a length) according to the present embodiment, and displays the read image on the first display surface 42 of the display unit 32. Specifically, as illustrated in FIG. 15, an instrument 182 being a ruler is displayed on the first display surface 42 of the display unit 32 of the mobile electronic device 101.

Because the first display surface 42 is a transparent display device, the rear face 4 side can be seen therethrough from the front face 3 side. Therefore, as illustrated in FIG. 15, the mobile electronic device 101 and a measurement object 184 are relatively moved to a position where the measurement object 184 is in close contact with an area corresponding to the first display surface 42 on the rear face 4 side of the housing 2, so that the instrument 182 can be overlapped on the measurement object 184. Thereby the length of the measurement object 184 can be measured by the instrument 182. The instrument 182 has scale marks displayed at intervals corresponding to the length of the measurement object 184 in close contact with the rear face 4 of the housing 2. In the present embodiment, the length of the measurement object 184 in its measurement direction is about 2 cm (a length exceeding 2 cm).

The mobile electronic device 101 is structured in such a manner that the back of the first display surface 42 is visible therethrough and further the instrument 182 is displayed on the first display surface 42, so that the mobile electronic device 101 can measure the measurement object 184 with the instrument 182 placed thereon. This enables the measurement object 184 to be measured without being placed on the display unit 32, and therefore even if the measurement object 184 is an object that cannot be moved, the instrument 182 can be overlapped on the object, and thus various types of objects can be measurement objects.

The main control unit 122 can display a length input by the user as a comparison object using the application for displaying the instrument 182. In addition, a measurement result of the measurement object 184 illustrated in FIG. 15 can be stored as a comparison object. A method of storing the comparison object includes a method of inputting a value measured by the user. At the time of measurement as illustrated in FIG. 15, it may be configured to display a cursor on the first display surface 42, move the cursor using the direction key by the user, specify a start point and an end point on the screen, and detect a distance between the specified start point and end point as a length. The start point may be set as a base point of the instrument 182, that is, a 0-cm point, and only the end point may be specified.

FIG. 16 represents a case of displaying the comparison object during measurement of the measurement object. First, to measure a measurement object 186, the mobile electronic device 101 and the measurement object 186 are relatively moved to a position where the measurement object 186 is in close contact with the area corresponding to the first display surface 42 on the rear face 4 side of the housing 2, and the instrument 182 is overlapped on the measurement object 186. As illustrated in FIG. 16, the mobile electronic device 101 also displays a comparison object 188 in addition to the instrument 182 on the first display surface 42. In this case, the comparison object 188 is a bar having a stored length, and is displayed so as to be overlapped on the image of the instrument 182. In this way, by displaying the comparison object 188, the user can intuitively recognize a difference in size between the comparison object 188 and the measurement object 186.

Figure 17:
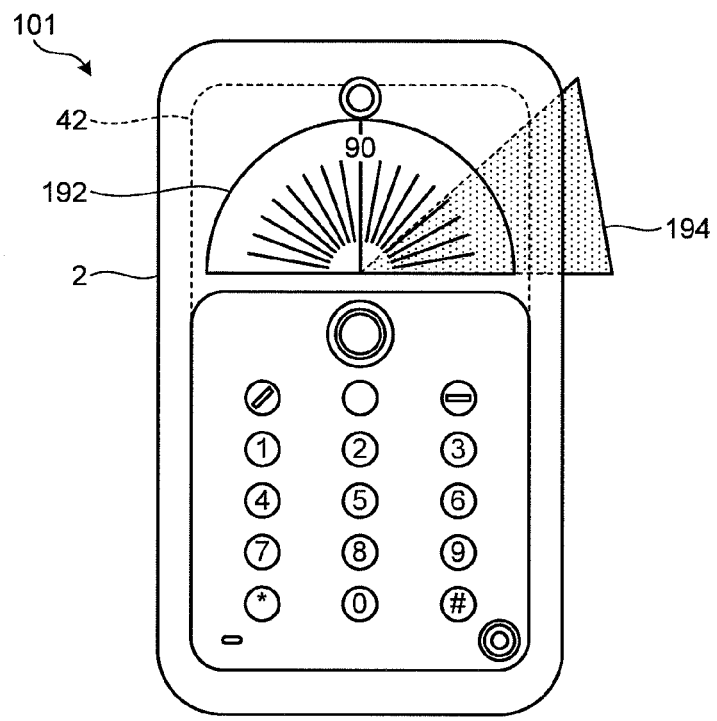
FIG. 17 is an explanatory diagram for explaining an operation of the mobile electronic device.
Figure 18:
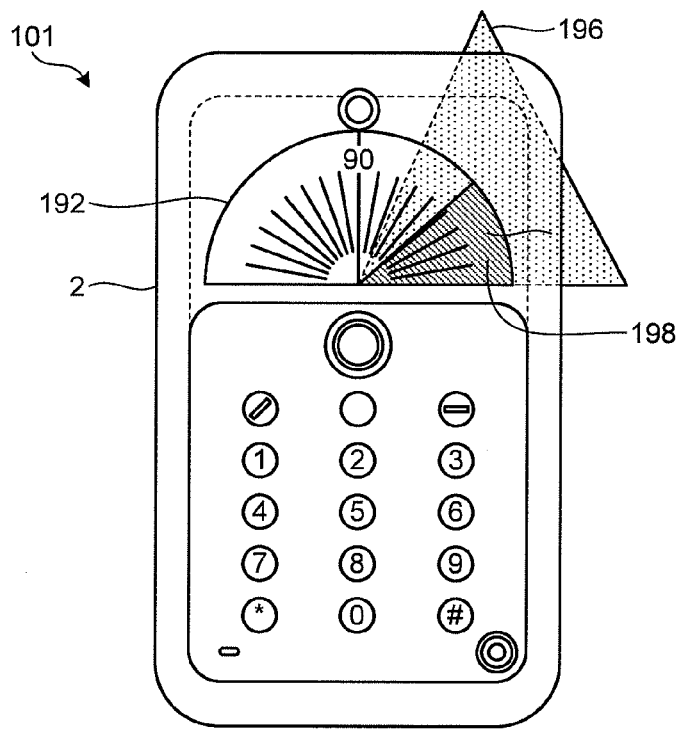
FIG. 18 is an explanatory diagram for explaining an operation of the mobile electronic device.

The ruler is used as the instrument as illustrated in FIG. 15 and FIG. 16; however, the instrument is not limited thereto. A case of using a protractor as the instrument is explained below with reference to FIG. 17 and FIG. 18. FIG. 17 and FIG. 18 are explanatory diagrams for explaining operations of the mobile electronic device.

After the activation of the application, the main control unit 122 according to the present embodiment reads an image, a protractor (instrument for measuring angles) in the present embodiment, from the instrument image folder 166, and displays the read protractor on the first display surface 42 of the display unit 32. Specifically, as illustrated in FIG. 17, an instrument 192 being the protractor is displayed on the first display surface 42 of the display unit 32 of the mobile electronic device 101.

The instrument 192 is displayed in this manner and the mobile electronic device 101 and a measurement object 194 are relatively moved similarly to the above manner, so that the instrument 192 can be overlapped on the measurement object 194. Thus, an angle (an angle between two vectors) of the measurement object 194 can be measured with the instrument 192.

The main control unit according to the present embodiment can also display an angle input by the user as a comparison object using the application for displaying the instrument. In addition, a measurement result of the measurement object 194 illustrated in FIG. 17 can be stored as a comparison object. A method of storing the comparison object is the same as the case of the length.

Also in the case of displaying the protractor, as illustrated in FIG. 18, when a measurement object 196 is to be measured, the mobile electronic device 101 can display a stored or set comparison object 198, in addition to the instrument 192, on the first display surface 42. In this case, the comparison object 198 is a bar having a stored angle, and is displayed so as to be overlapped on the image of the instrument 192.

In this way the case of using the protractor as the instrument also enables to measure angles of various target objects, similarly to the case of the ruler. By displaying the comparison object, the user can intuitively compare angles.

The instrument displayed on the display unit 32 is not limited to the ruler and the protractor, and therefore various types of instruments used to measure a shape such as a length and an angle can be displayed thereon. Moreover, the user simply selects an instrument to be displayed from among instrument folders as required.

The mobile electronic device 101 may perform communications with an external device via the communicating unit 26 to acquire image data for the instrument. In this way, by acquiring the image data for the instrument from the external device, images of various instruments can be acquired. Moreover, image data to be stored in the instrument image folder 166 of the storage unit 124 can be reduced.

Figure 19:
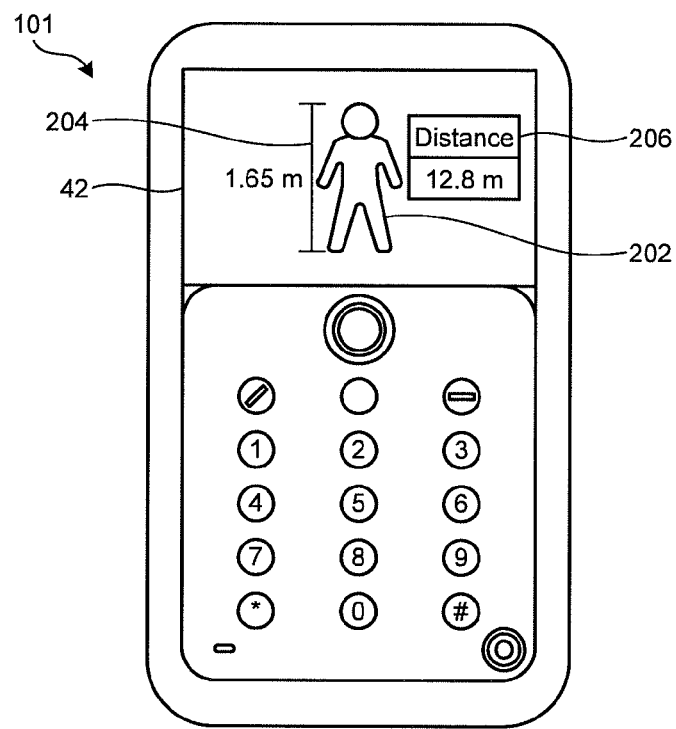
FIG. 19 is an explanatory diagram for explaining an operation of the mobile electronic device.
Figure 20:
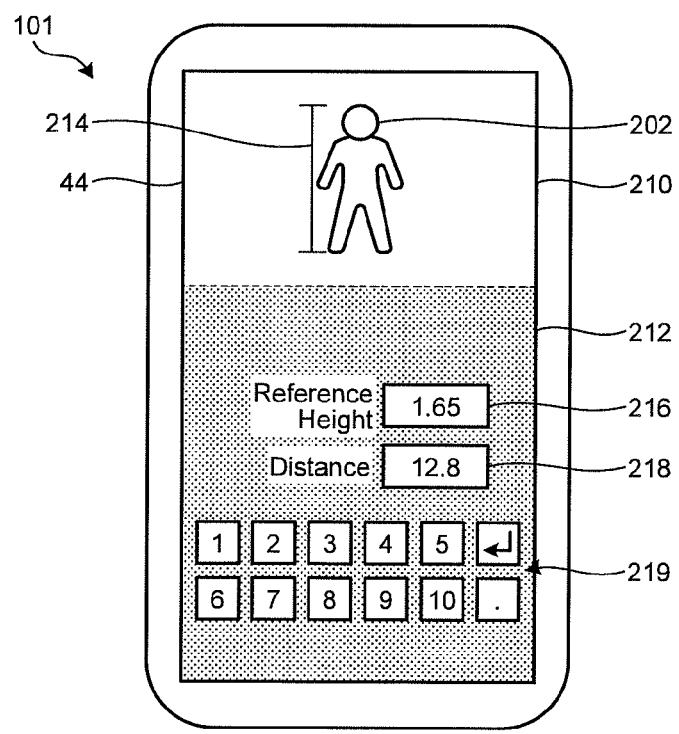
FIG. 20 is an explanatory diagram for explaining an operation of the mobile electronic device.

An operation of the mobile electronic device 101, specifically, an operation performed when the measurement program 162 is executed is explained with reference to FIG. 19 and FIG. 20. FIG. 19 and FIG. 20 are explanatory diagrams for explaining operations of the mobile electronic device. FIG. 19 represents a case where the front face 3 of the housing 2 faces the user and an image is displayed on the first display surface 42. FIG. 20 represents a case where the rear face 4 of the housing 2 faces the user and an image is displayed on the second display surface 44. An application for measuring a size of a target object or a distance to the target object executed by processing the measurement program 162 (hereinafter, "measurement application") detects, when one of the size of the target object and the distance to the target object is known, the other value which is unknown, and outputs the detected value as a measurement result.

First, when an activation instruction of the measurement application is input by the user, the mobile electronic device 101 causes the main control unit 122 to process the measurement program 162 stored in the storage unit 124 to activate the measurement application. After the activation of the measurement application, the main control unit 122 displays a reference bar 204 as illustrated in FIG. 19.

The user places a target object being a person 202 in the present embodiment on the first display surface 42 with the reference bar 204 displayed thereon. Thereafter, the user makes a length of the reference bar 204 displayed on the first display surface 42 the same as a length of the person 202. The main control unit 122 of the mobile electronic device 101 changes the position and the length of the reference bar 204 in the first display surface 42 based on an operation input by the user.

When the length of the reference bar 204 is made the same as the length of the person 202, the user inputs the known value. For example, when the length (body height) of the person 202 is known, the user inputs the length of the person 202, 1.65 m in the present embodiment. When the length of the person 202, that is, the length of the reference bar 204 is input, the main control unit 122 of the mobile electronic device 101 calculates a distance to the person 202 based on the length of the reference bar 204 displayed on the first display surface 42 and the input value of the length. The main control unit 122 displays the calculated distance as an item 206 on the first display surface 42.

When the distance to the person 202 is known, the distance is input, and the main control unit 122 can thereby also calculate an actual length of the person 202 from a relation between the input distance and the length of the reference bar 204 displayed on the first display surface 42. A triangular method (a calculation method used for triangulation) can be used as a calculation method.

In the mobile electronic device 101, the target object can be checked through the first display surface 42 even when the target object is overlapped on the first display surface 42. Thereby it is possible to match the reference bar 204 displayed on the first display surface 42 and the size of the target object on the screen. Furthermore, by inputting the known size of the target object or the known distance to the target object, the mobile electronic device 101 can calculate an unknown distance to the target object or an unknown size of the target object. In addition, because the mobile electronic device 101 measures a real thing, as a target, actually seen through the screen, the user can intuitively understand the measurement result.

In the present embodiment, an image is displayed on the first display surface 42; however, an image may be displayed on the second display surface 44 to execute the measurement application. A case of displaying an image on the second display surface 44 is explained below with reference to FIG. 20. As illustrated in FIG. 20, in the mobile electronic device 101, an area including the first display surface 42 and the second display surface 44 of the second display surface 44 is a first display area 210, and an area including only the second display surface 44 is a second display area 212. When an image is not displayed on the display unit 32, the first display area 210 is transparent, so that a sight on the other side of the housing 2 is seen through the screen, and the circuit board 8 is seen in the second display area 212. The main control unit 122 makes a background of the first display area 210 transparent (that is, in a transparent state), and makes a background of the second display area 212 opaque.

First, when an activation instruction of the measurement application is input by the user, the mobile electronic device 101 causes the main control unit 122 to process the measurement program 162 stored in the storage unit 124, to activate the measurement application. After the activation of the measurement application, the main control unit 122 displays a reference bar 214 on the second display surface 44 as illustrated in FIG. 20.

The user places the person 202 on the first display area 210 of the second display surface 44 with the reference bar 214 displayed thereon. Thereafter, the user moves the reference bar 214 displayed on the second display surface 44 to the first display area 210 and makes a length of the reference bar 214 the same as the length of the person 202. The main control unit 122 of the mobile electronic device 101 changes the position and the length of the reference bar 214 in the second display surface 44 based on an operation input by the user. The reference bar 214 may be previously displayed on the first display area 210. The main control unit 122 detects an operation input to the touch panel 14 as a user's operation.

When the length of the reference bar 214 is made the same as the length of the person 202, the user inputs the known value. The main control unit 122 displays an item 216 for displaying the height of the reference bar 214, an item 218 for displaying a distance to the target object, and numeric buttons 219 in the second display area 212. The main control unit 122 detects an input of a numerical value by detecting pressing of a position corresponding to any one of the numeric buttons 219 by the user on the touch panel 14. For example, when the length (body height) of the person 202 is known, and 1.65 m is input as the length of the person 202, the main control unit 122 displays an input result in the item 216. Selection of an item to be input, that is, whether to input a reference height or to input a distance is simply determined by detecting whether the user touches the position corresponding to either one of the items. Furthermore, the main control unit 122 calculates the distance to the person 202 based on the length of the reference bar 204 displayed on the first display surface 42 and the input value of the length. The main control unit 122 displays the calculated distance in the item 218.

In this manner, even if an image is displayed on the second display surface 44, the main control unit 122 can calculate the distance to the target object or the size of the target object with the same process as explained above, and display the calculated value. The second display surface 44 has a larger display area than that of the first display surface 42, so that various pieces of information can be displayed thereon. In addition, because the user can input an operation to the touch panel 14, the position and the size of the reference bar 214 can be adjusted without operating the direction key or so. Thus, an intuitive operation becomes possible.

The case of the measurement application is explained with reference to FIG. 20; however, an image may be displayed on the second display surface 44 even when the application for displaying an instrument is executed.

Figure 21:
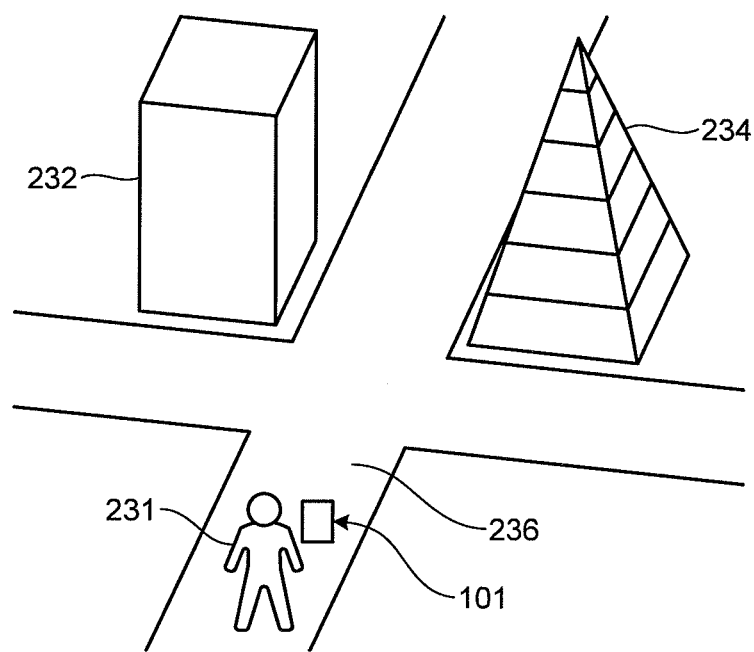
FIG. 21 is an explanatory diagram for explaining situations of surroundings of the mobile electronic device.
Figure 22:
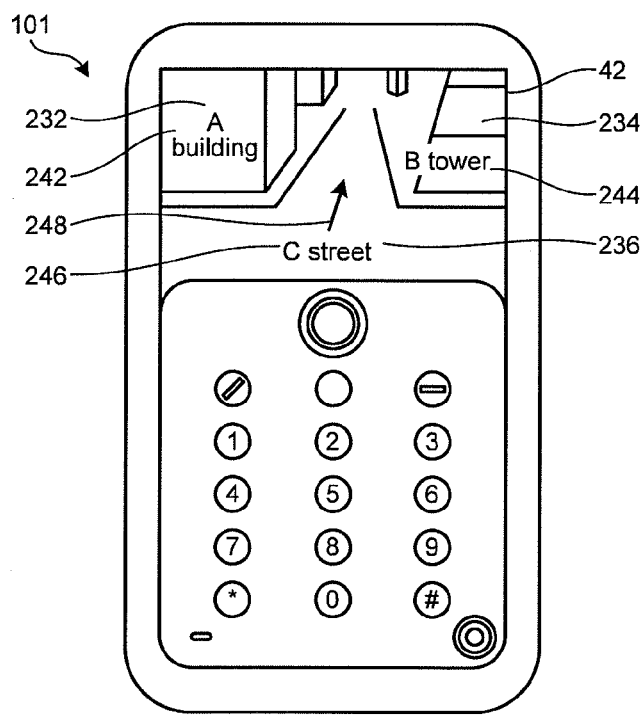
FIG. 22 is an explanatory diagram for explaining an operation of the mobile electronic device.
Figure 23:
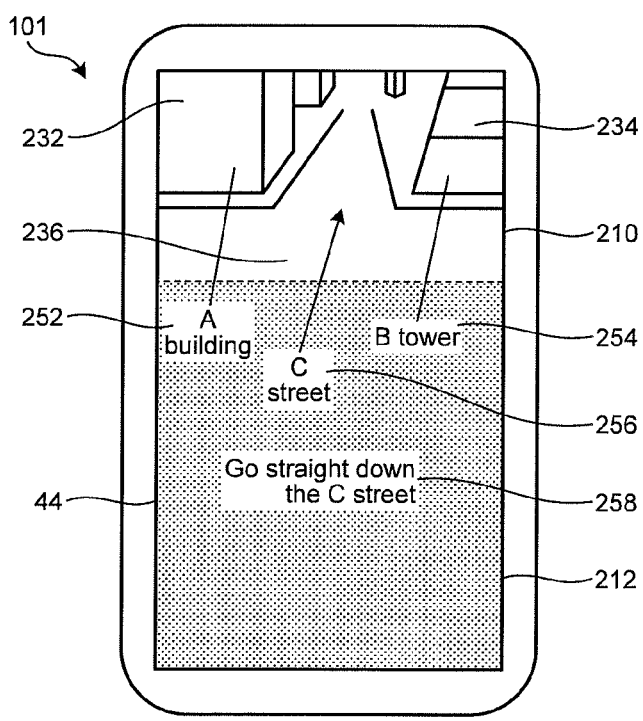
FIG. 23 is an explanatory diagram for explaining an operation of the mobile electronic device.

An operation of the mobile electronic device 101, specifically, an operation performed when the navigation program 164 is executed is explained with reference to FIG. 21, FIG. 22, and FIG. 23. FIG. 21 is an explanatory diagram for explaining situations of surroundings of the mobile electronic device, and FIG. 22 and FIG. 23 are explanatory diagrams for explaining operations of the mobile electronic device. FIG. 22 represents a case where the front face 3 of the housing 2 faces the user and an image is displayed on the first display surface 42. FIG. 23 represents a case where the rear face 4 of the housing 2 faces the user and an image is displayed on the second display surface 44. The navigation application, executed by processing the navigation program 164, detects a current location of the user and a direction the user faces, and notifies the user of the situations of the surroundings. The navigation application can also notify the user of guidance information for a set destination.

First, as illustrated in FIG. 21, the user (person 231) holding the mobile electronic device 101 stands on a road 236 where a building 232 and a tower 234 are located in the direction the user faces. The mobile electronic device 101 at this location is explained as a case where the navigation application is activated. The building 232 is named as an A building, the tower 234 as a B tower, and the road 236 as a C street.

First, when an activation instruction of the navigation application is input by the user, the mobile electronic device 101 causes the main control unit 122 to process the navigation program 164 stored in the storage unit 124 to activate the corresponding application. After the activation of the application, the main control unit 122 acquires location information of the mobile electronic device 101 using the GPS communicating unit 137, and further detects a direction the mobile electronic device 101 faces and an angle with respect to a horizontal plane using the geomagnetic sensor 138. When the location of the mobile electronic device 101, the direction it faces, and the angle are detected, the main control unit 122 acquires map information for a corresponding area (surroundings of the location where the user is). For map information, the map information stored in the storage unit 124 may be acquired or the information may be acquired from an external database through the communicating unit 26.

After acquisition of the map information, the main control unit 122 detects a sight seen through the first display surface 42, that is, a building and a road included in the sight seen overlapping on the first display surface 42 when the user views the first display surface 42, based on the location, the direction it faces, and the angle. Thereafter, the main control unit 122 calculates locations of the building and the road detected and seen in the first display surface 42, and displays information for the building and the road (for example, names thereof) at the corresponding locations. Specifically, as illustrated in FIG. 22, when the building 232, the tower 234, and the road 236 are seen overlapping on the first display surface 42, the main control unit 122 displays textual information 242 as "A building" at the location overlapping the building 232, displays textual information 244 as "B tower" at the location overlapping the tower 234, and displays textual information 246 as "C street" at the location overlapping the road 236. The main control unit 122 also displays a direction along which the user should proceed using an arrow 248.

The mobile electronic device 101 can provide intuitive and easy-to-understand information to the user by displaying information for navigation overlapped on the background seen overlapping on the first display surface 42. Specifically, by displaying the navigation information overlapped on an actual background (scenery, building), there is no need for the user to compare the navigation information with the actual background to make a judgment. That is, there is no need to compare the map or the information displayed on the first display surface 42 with the actual scenery and to associate them with each other, but by looking at only the first display surface 42, the user can understand the association. Therefore, the user can more easily understand the information for the surroundings around himself/herself and the road along which the user should move.

In the embodiment, both the information for the directions and the information for the surroundings are displayed; however, the information to be displayed may be switched to one another according to user's purpose.

In the embodiment, the image is displayed on the first display surface 42; however, when the navigate application is executed, an image may also be displayed on the second display surface 44. A case of displaying an image on the second display surface 44 is explained below with reference to FIG. 23. Also in the present embodiment, the background of the first display area 210 is made transparent (that is, in a transparent state), and the background of the second display area 212 is made opaque.

After the activation of the navigation application, the mobile electronic device 101 acquires location information of the mobile electronic device 101 using the GPS communicating unit 137, and further detects a direction the mobile electronic device 101 faces and an angle with respect to the horizontal plane using the geomagnetic sensor 138. When the location of the mobile electronic device 101, the direction it faces, and the angle are detected, the main control unit 122 acquires map information for the corresponding area. After the acquisition of the map information, the main control unit 122 detects a building and a road included in the sight seen through the first display area 210 of the second display surface 44 based on the location, the direction it faces, and the angle.

Furthermore, the main control unit 122 calculates locations of the building and the road detected and seen in the first display area 210, and displays information for the building and the road (for example, names thereof) at the corresponding locations. Specifically, as illustrated in FIG. 23, when the building 232, the tower 234, and the road 236 are seen overlapping on the first display area 210, the main control unit 122 displays textual information 252 as "A building", textual information 254 as "B tower", and textual information 256 as "C street". In this case, the textual information 252, the textual information 254, and the textual information 256 are displayed in the second display area 212. Displayed on the second display surface 44 are a line connecting the textual information 252 and the location overlapping the building 232, a line connecting the textual information 254 and the location overlapping the tower 234, and an arrow indicating a location where the textual information 256 overlaps on the road 236. Moreover, the main control unit 122 displays textual information 258 as "go straight down the C street" indicating the direction along which the user should proceed in the second display area 212.

In this way, even when the image is displayed on the second display surface 44, the navigation application can also be executed similarly to the case illustrated in FIG. 22. When the image is displayed on the second display surface 44, by displaying textual information in the second display area 212, the background seen through the first display area 210 can be clearly checked. Namely, by preferentially displaying information created using the navigate application in the second display area 212, the information can be acquired while making the background more visible. Thus, the acquired information can be made more understandable. In the embodiment, each portion of the background and information are associated with each other using the arrow or the line; however, the association is not limited thereto, and therefore numbers may be assigned for the association.

The embodiment has explained the case where the mobile electronic device is used for measurement using instrument, surveying, and navigation; however, it is not limited thereto. The mobile electronic device can use various types of applications in which a relation between the mobile electronic device and an object (background) seen overlapping on the first display surface 42 or overlapping on the first display area 210 of the second display surface 44 is processed based on a scale (length, size) and/or an orientation (direction). In any case, an object and an image on the display unit can be overlapped on each other, so that the information displayed on the display unit can be made intuitively understandable.

As explained in the embodiment (FIG. 20 and FIG. 23), the mobile electronic device 101 preferably switches setting of an image displayed on the second display surface 44 between the first display area 210 (area not facing the circuit board 8) and the second display area 212 (area facing the circuit board 8). That is, different display control is preferably performed in the area including the first display surface 42 and the second display surface 44 and in the area including only the second display surface 44, of the display unit 32.

Specifically, when a standby screen is displayed, the background of the first display area 210 is made transparent, and the background of the second display area 212 is made opaque. In this way, by making the second display area 212 opaque, that is, by displaying some image, the display area can be made transparent while making the circuit board 8 on the rear face 4 of the second display area 212 invisible. This enables to suppress the circuit board 8 from being visible while making use of the transparent aesthetic appearance of the mobile electronic device 101.

The backgrounds are switched to one another between the first display area 210 and the second display area 212; however, images to be displayed may be switched to one another. Specifically, when a standby image is displayed, an image may be displayed only in the second display area 212 and an image may be prevented from being displayed in the first display area 210. Even by doing this way, it is possible to suppress the circuit board 8 from being visible while maintaining the first display area 210 transparent. It may be configured that the main control unit 122 preferentially displays an image in the second display area 212 and displays an image in the first display area 210 when the displayed image becomes a certain size. Also in this case, the background (wallpaper) is preferably transparent.

Also in the case where an operation screen and an image of some other application are displayed, it is preferable that the background of the first display area 210 be made transparent and the background of the second display area 212 be made opaque. The background displayed in the first display area 210 is not limited to the wallpaper. The main control unit 122 simply displays only an image required to display the information (image), and simply makes the first display area 210 transparent as the background instead of displaying the other image elements. For example, when the textual information is to be displayed, only the textual information is displayed, and the other images are prevented from being displayed.

In the embodiment, the side face 5 of the housing 2 of the mobile electronic device 101 is formed into a curved face; however, the present invention is not limited thereto. As for the side face 5 of the housing 2, for example, it is preferable that the circuit board 8 inside the housing 2 cannot be seen (cannot be recognized) or the circuit board 8 be difficult to see when the housing 2 is viewed from the direction parallel to the front face 3 and the rear face 4, and that at least part of the side face 5 be inclined with respect to the direction perpendicular to the front face 3. In this way, by forming at least part of the side face 5 into a shape inclined with respect to the direction perpendicular to the front face 3, that is, into a shape that is not a planar shape perpendicular to the front face 3, the circuit board 8 inside the housing 2 cannot be seen (cannot be recognized), or the circuit board 8 can be made difficult to see. For example, the side face 5 of the housing 2 can be formed into a waveform shape, a curved shape being convex toward the center of the housing 2, and a shape formed with two slopes inclined in directions of separating from the center of the housing 2 with respect to the direction perpendicular to the surface.

To improve the aesthetic appearance of the mobile electronic device 101, the housing 2 is preferably made transparent; however, the present invention is not limited thereto, and therefore it only has to be configured such that the background can be overlapped on a predetermined area of the display unit 32, that is, the display unit 32 is transparent and the background overlaps on the predetermined area, and the housing 2 may be opaque.

Figure 24:
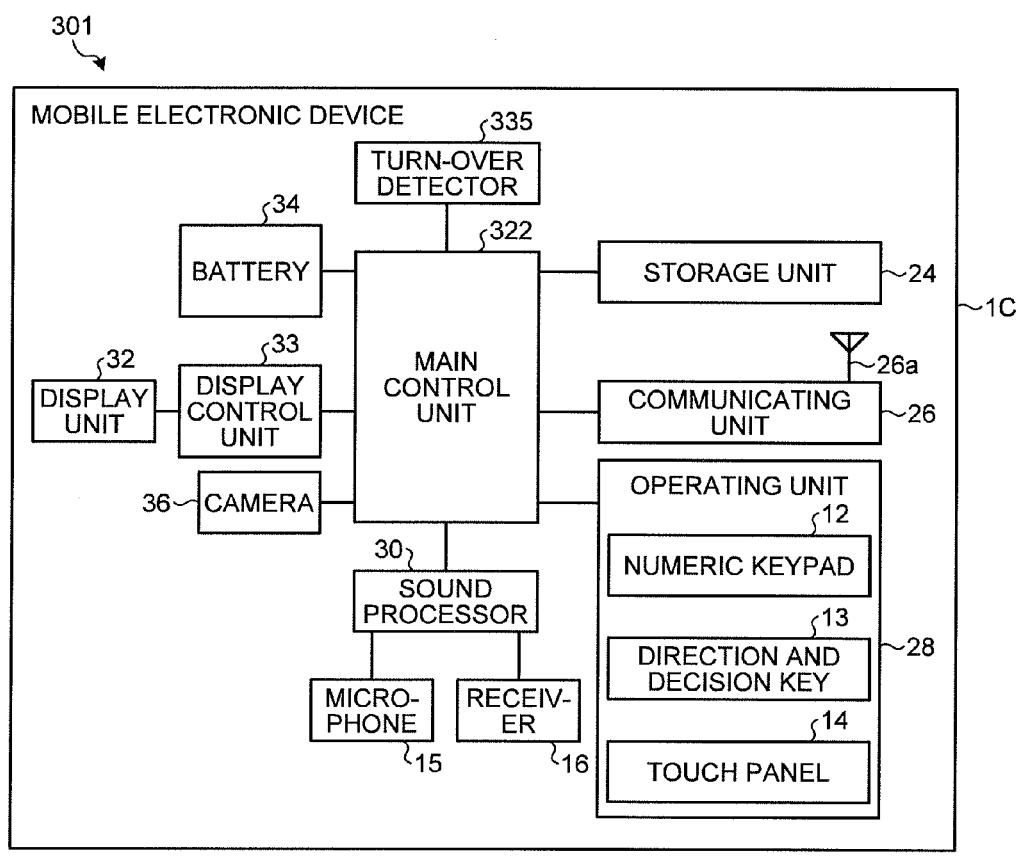
FIG. 24 is a block diagram of a schematic configuration of functions of a mobile electronic device according to still another embodiment.

Still another embodiment of the mobile electronic device is explained with reference to FIG. 24 to FIG. 36. A mobile electronic device 301 of the present embodiment has a shape of external appearance similar to that of the mobile electronic device 1 illustrated in FIG. 1 to FIG. 5, and therefore explanation thereof is omitted. In the mobile electronic device 301 according to the present embodiment, when the user views the first display surface 42 from the front face 3 side, a main control unit 332 causes the first display surface 42 to display an image. In the mobile electronic device 301, when the user views the second display surface 44 from the rear face 4 side, the main control 332 unit causes the second display surface 44 to display an image. In this way, in the present embodiment, the control unit switches between the display of an image using the first display surface 42 and the display of an image using the second display surface 44 depending on the direction in which the user views the display unit 32, and this enables the display unit 32 of the mobile electronic device 301 to display images on the both surfaces. FIG. 24 is a block diagram of a schematic configuration of functions of the mobile electronic device illustrated in FIG. 1. As illustrated in FIG. 24, the mobile electronic device 301 includes the main control unit 322, the storage unit 24, the communicating unit 26, the operating unit 28, the sound processor 30, the display unit 32, the display control unit 33, the battery 34, a turn-over detector 335, and the camera 36. The communicating unit 26, the operating unit 28, the sound processor 30, the display unit 32, the display control unit 33, the battery 34, and the camera 36 are the same as these of the mobile electronic device 1, and therefore explanation thereof is omitted. The main control unit 322 is a processor, for example, MPU (Micro Processing Unit) that integrally controls entire operations of the mobile electronic device 301.

The main control unit 322 controls operations of the display unit 32, the communicating unit 26, and the like so that the various processes of the mobile electronic device 301 are executed in an appropriate procedure according to an operation of the operating unit 28 and software stored in the storage unit 24 of the mobile electronic device 301. The main control unit 322 executes the processes based on the programs (e.g., an operating system program, application programs, etc.) stored in the storage unit 24.

The turn-over detector 335 detects a turn-over of the housing 2 of the mobile electronic device 301 illustrated in FIG. 1 to FIG. 5. That is, it is detected that the positional relation between the front face 3 and the rear face 4 of the housing 2 has been inverted. Thereby it is detected that the positional relation between the first display surface 42 and the second display surface 44 has been inverted. In the example of FIG. 5, user's eye Ey looks at the first display surface 42; however, when the housing 2 is turned over, the user's eye Ey results in looking at the second display surface 44. The turn-over detector 335 detects the turn-over of the housing 2 to thereby generate information for determination which of the first display surface 42 and the second display surface 44 the user is looking at.

The turn-over detector 335 can be provided with, for example, an acceleration sensor. The acceleration sensor can detect an attitude of the housing 2, and can therefore detect directions to which the display surface of the first display surface 42 and the display surface of the second display surface 44 are directed. Moreover, the acceleration sensor can detect acceleration acting on the housing 2, and can therefore also detect a movement of the housing 2.

The turn-over detector 335 may be the touch panel 14. When the user holds the housing 2 of the mobile electronic device 301 to look at the first display surface 42, the user's hand touches the touch panel 14. When the user holds the housing 2 of the mobile electronic device 301 to look at the second display surface 44, the user's hand hardly touches the touch panel 14 except when the user operates the touch panel 14. In this way, an area of the user's hand touching the touch panel 14 is different between when the user looks at the first display surface 42 and when the user looks at the second display surface 44. Therefore, by using the difference between the areas, it can be determined which of the first display surface 42 and the second display surface 44 the user is looking at. In addition, by using the change in the area of the user's hand detected by the touch panel 14, it can be determined whether the housing 2 has been turned over.

The main control unit 322 switches between the display of an image using the first display surface 42 and the display of an image using the second display surface 44 according to the detection result of the turn-over detector 335. For example, when the user is looking at the first display surface 42, then the main control unit 322 performs control so as to display an image on the first display surface 42. When the turn-over detector 335 detects the turn-over of the housing 2 during the display, the main control unit 322 obtains the detection result of the turn-over detector 335, that is, the detection result indicating that the housing 2 has been turned over, and switches the display of the image using the first display surface 42 to the display of the image using the second display surface 44. When the turn-over detector 335 detects the turn-over of the housing 2 during the display of the image using the second display surface 44, the main control unit 322 switches the display of the image using the second display surface 44 to the display of the image using the first display surface 42.

Because of this, the display of the image using the second display surface 44 allows a large screen display. When the housing 2 is turned over during the display of the image using the second display surface 44, the first display surface 42 appears together with the physical keys, and therefore characters, numbers, or symbols or so can be input using the first display surface 42 and the physical keys. Thereby the physical keys excellent in operability as compared with the touch panel 14 can be used when text or the like is input, thus improving input operability. In this manner, the mobile electronic device 301 can improve the operability while implementing the large screen display.

The main control unit 322 causes the screen to determine (select) an image to be displayed, and can thereby display an appropriate image for the screen. That is, the main control unit 322 displays an appropriate image for an input using a physical key, for example, an image of a text box or a mail on the first display surface 42, and confirms it while displaying an input of a physical key on the first display surface 42. This improves the operability at the time of performing an input to the mobile electronic device 301. In addition, the mobile electronic device 301 displays a moving image and an image such as a digital book on the second display surface 44, and displays much information on the large screen. As explained above, in the present embodiment, an image appropriate for the screen used can be displayed.

The mobile electronic device 301 is provided with the numeric keypad 12, the direction and decision key 13, and the first display surface 42 on the front face 3, and is provided with the touch panel 14 and the second display surface 44, whose display area is larger than the first display surface 42, on the rear face 4. Thus, the front face 3 and the rear face 4 can be used differently according to how to use the mobile electronic device 301. For example, the front face 3 can be used for operations with many inputs of numbers and characters for a mail or so, and the rear face 4 can be used for operations in which enlargement and selection of a screen are main operations, for example, for operations performed when a moving image or an image is appreciated. Thus, the operability of the mobile electronic device 301 can be improved.

(Screen Switching Example 1)

Figure 25:
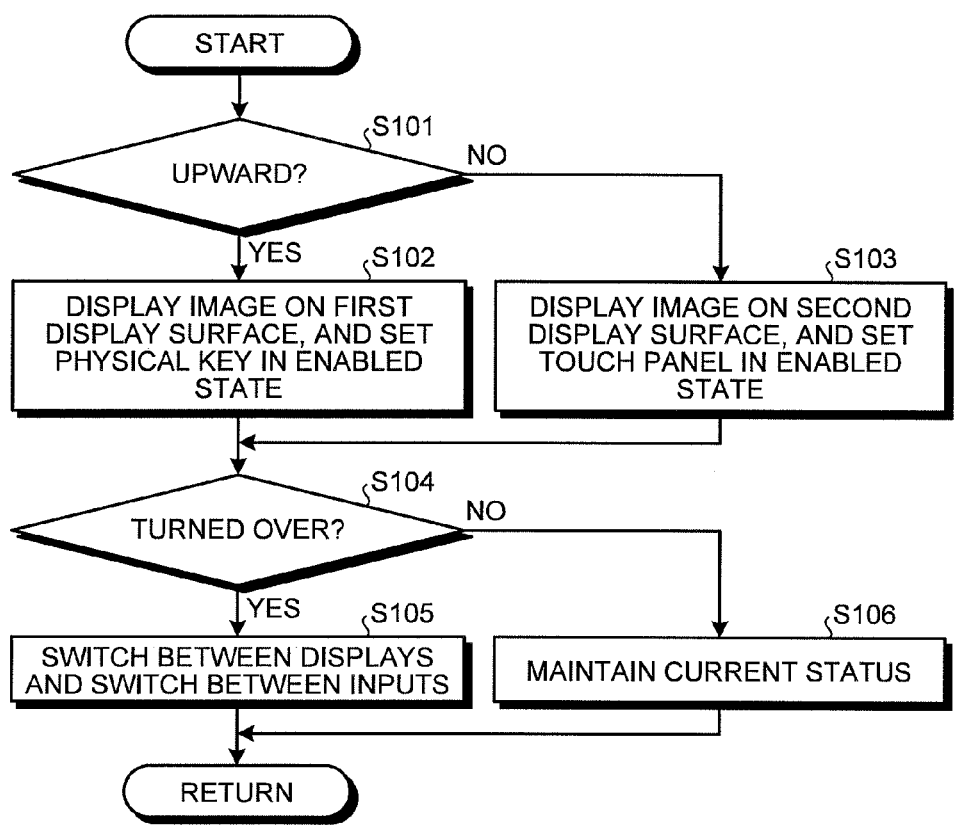
FIG. 25 is a flowchart of a first method for switching between screens displaying images using the mobile electronic device according to the embodiment.

FIG. 25 is a flowchart of a first method for switching between screens displaying images using the mobile electronic device according to the present embodiment. In the first method, an acceleration sensor is used for the turn-over detector 335. In the followings, it is assumed that when the display surface of the first display surface 42 of the mobile electronic device 301 illustrated in FIG. 5 is directed to an opposite direction to an acting direction of gravity (vertical direction; direction indicated by arrow G in FIG. 5), the housing 2 of the mobile electronic device 301 faces upward. It is also assumed that when the display surface of the first display surface 42 is directed to the vertical direction, the housing 2 of the mobile electronic device 301 faces downward. In these cases, the display surface of the first display surface 42 may be inclined with respect to the vertical direction.

Upon executing the screen switching example 1, at Step S101, the main control unit 322 of the mobile electronic device 301 illustrated in FIG. 24 determines whether the housing 2 of the mobile electronic device 301 faces upward, from the detection result of the turn-over detector 335. For example, as illustrated in FIG. 5, when the mobile electronic device 301 is placed so that the front face 3 and the rear face 4 of the housing 2 are perpendicular to the vertical direction, it is determined that the housing 2 faces upward. When the housing 2 is turned over from this state, the positional relation between the front face 3 and the rear face 4 of the housing 2 is inverted, and therefore an output of the acceleration sensor installed in the mobile electronic device 301 is inverted (e.g., a sign is inverted). The housing 2 is kept upward until the output of the acceleration sensor is inverted while the housing 2 is upward, and it can be determined that the housing 2 is turned over from the upward state to the downward state when the output of the acceleration sensor is inverted. When the main control unit 322 determines that the housing 2 faces upward, from the detection result of the turn-over detector 335 (acceleration sensor) (Yes at Step S101), the process proceeds to Step S102. At Step S102, the main control unit 322 displays an image on the first display surface 42, and sets the physical keys (the numeric keypad 12 and the direction and decision key 13) to an enabled state, that is, to a state in which an input by a physical-key is received.

The first display surface 42 is provided on the front face 3 where the physical keys are also provided. Many users of the mobile electronic device 301 make the housing 2 upward when the physical keys are used and direct the physical keys toward themselves. Therefore, when the housing 2 faces upward, that is, the first display surface 42 faces upward, the physical keys are set to an enabled state, and therefore the mobile electronic device 301 can receive an input through the physical keys without delay for the start of using the physical keys. As a result, the convenience of the mobile electronic device 301 is improved. At Step S102, the main control unit 322 has only to display an image on at least the first display surface 42, and therefore the physical keys are not necessarily set to the enabled state (thereafter the same as above).

At Step S101, when the main control unit 322 determines that the housing 2 does not face upward, that is, faces downward (No at Step S101), the process proceeds to Step S103. At Step S103, the main control unit 322 displays an image on the second display surface 44, and sets the touch panel 14 to an enabled state, that is, a state in which an input by the touch panel 14 is received. When the housing 2 faces downward, that is, the second display surface 44 faces upward, by setting the touch panel 14 to the enabled state, the mobile electronic device 301 can receive an input through the touch panel 14 without delay for the start of using the touch panel 14. As a result, the convenience of the mobile electronic device 301 is improved. At Step S103, the main control unit 322 has only to display an image on at least the second display surface 44, and therefore the touch panel 14 is not necessarily set to the enabled state (thereafter the same as above).

After Step S102 or Step S103 is ended, the process proceeds to Step S104. At Step S104, the main control unit 322 determines whether the housing 2 of the mobile electronic device 301 has been turned over, from the detection result of the turn-over detector 335. For example, when the turn-over detector 335 detects a rotational movement of the housing 2 or detects that the vertical relation between the front face 3 and the rear face 4 of the housing 2 is inverted, the main control unit 322 determines that the housing 2 has been turned over.

When the main control unit 322 determines that the housing 2 has been turned over (Yes at Step S104), the process proceeds to Step S105, and the main control unit 322 switches between the displays and switches between the inputs. That is, the main control unit 322 uses one of the two screens, provided in the mobile electronic device 301, which has not been used for a display of an image before the turn-over, for a display of an image after the turn-over. The main control unit 322 then sets either one of the physical keys and the touch panel 14, which has not been set to an input reception state before the turn-over, to an input reception state after the turn-over. This enables an image to be displayed on the screen of the mobile electronic device 301 facing the user after the turn-over, and an input to the operating unit facing the user to be received.

When the main control unit 322 determines that the housing 2 has not been turned over (No at Step S104), the process proceeds to Step S106, and the main control unit 322 maintains its current status. That is, the main control unit 322 continues an image display on the screen, of the two screens provided in the mobile electronic device 301, used for the display of the image upon determination at Step S104. The main control unit 322 then maintains one of the physical keys and the touch panel 14, which is in the input reception state upon determination at Step S104, as it is. The turn-over of the housing 2 allows the screens used to display an image to be switched to one another in the above procedure.

(Screen Switching Example 2)

Figure 26:
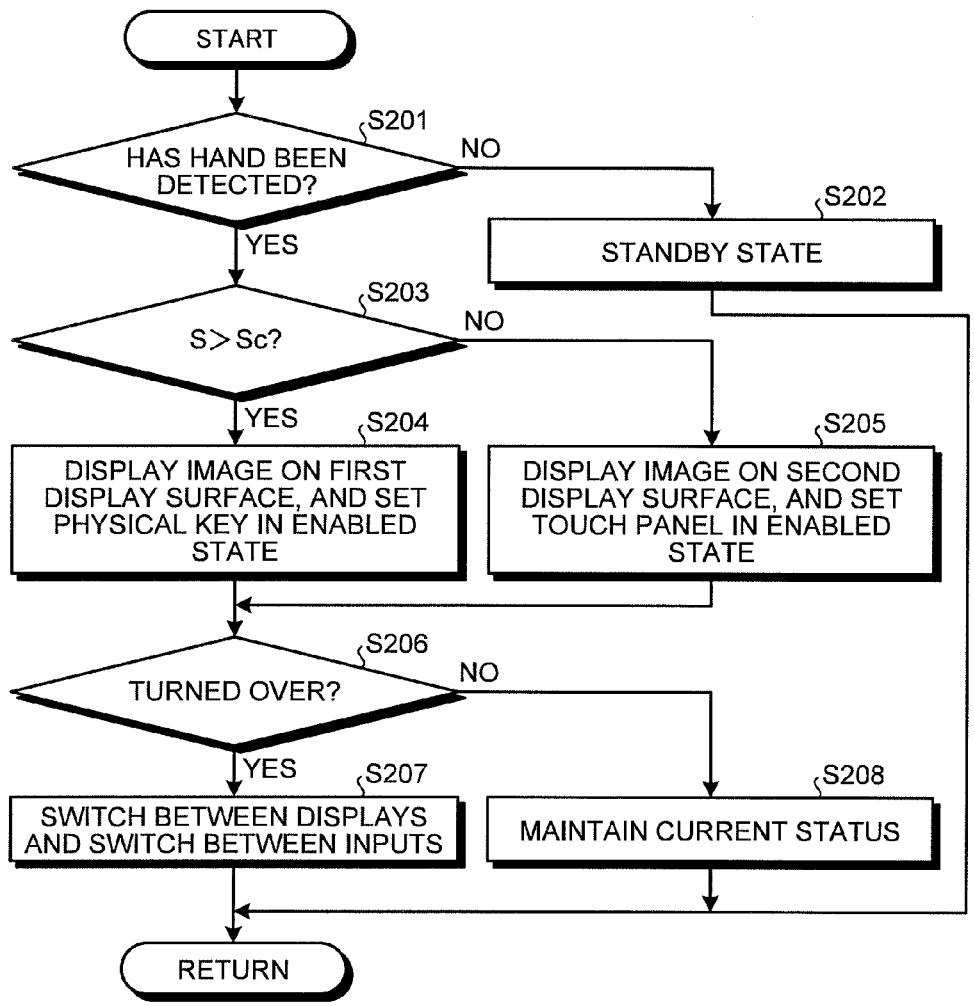
FIG. 26 is a flowchart of a second method for switching between screens displaying images in the mobile electronic device according to the embodiment.
Figure 27:
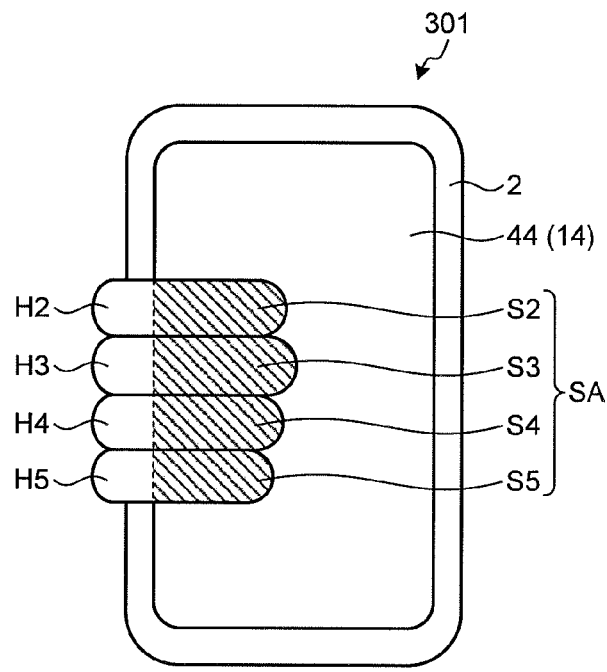
FIG. 27 is a schematic diagram of how a hand touches a touch panel provided in the mobile electronic device according to the embodiment.
Figure 28:
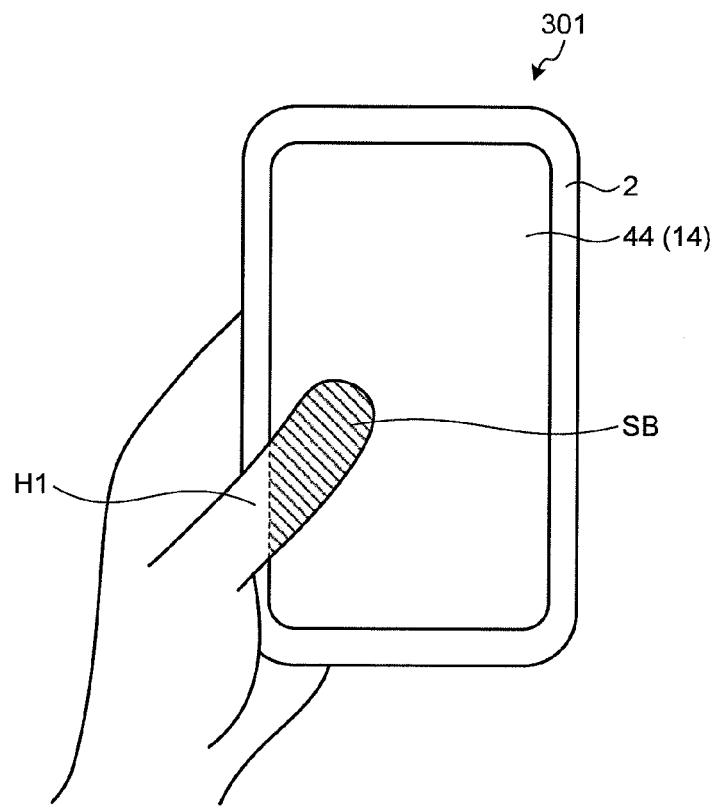
FIG. 28 is a schematic diagram of how the hand touches the touch panel provided in the mobile electronic device according to the embodiment.

FIG. 26 is a flowchart of a second method for switching between screens displaying images in the mobile electronic device according to the present embodiment. FIG. 27 and FIG. 28 are schematic diagrams of how a hand touches a touch panel provided in the mobile electronic device according to the present embodiment. In the second method, the touch panel 14 is used for the turn-over detector 335. Upon executing the screen switching example 2, the main control unit 322 of the mobile electronic device 301 illustrated in FIG. 24 determines whether the user's hand has been detected, from the detection result of the touch panel 14 being the turn-over detector 335 (Step S201).

When the main control unit 322 determines that the hand has not been detected (No at Step S201), the process proceeds to Step S202, and the main control unit 322 sets the mobile electronic device 301 to a standby state. The standby state is a state where the mobile electronic device 301 awaits reception. In the standby state, the main control unit 322 displays a standby image on the first display surface 42 or on the second display surface 44 as required. When the main control unit 322 determines that the hand has been detected (Yes at Step S201), the process proceeds to Step S203, and the main control unit 322 calculates an area (contact area) S of the hand in contact with the touch panel 14 and compares the calculated area with a predefined contact-area threshold Sc.

When the user holds the housing 2 of the mobile electronic device 301 by hand and looks at the first display surface 42 illustrated in FIG. 5, as illustrated in FIG. 27, user's fingers H2, H3, H4, and H5 touch the touch panel 14 provided on the second display surface 44 side of the mobile electronic device 301. A first contact area SA at this time is a sum of areas S2, S3, S4, and S5 (SA=S2, S3, S4, S5) where the fingers H2, H3, H4, and H5 are in contact with the touch panel 14. Meanwhile, as illustrated in FIG. 28, when the user holds the housing 2 of the mobile electronic device 301 by hand and looks at the second display surface 44, a user's finger H1 touches the touch panel 14 provided on the second display surface 44 side of the mobile electronic device 301. A second contact area SB at this time is an area where the finger H1 is in contact with the touch panel 14.

As explained above, the contact area S is different between when the user is looking at the first display surface 42 of the mobile electronic device 301 and when the user is looking at the second display surface 44. Specifically, the contact area S is larger in the case where the user is looking at the first display surface 42 of the mobile electronic device 301 (SA>SB). The main control unit 322 determines, by using this, which of the first display surface 42 and the second display surface 44 the user is looking at based on the size of the contact area S. For example, the contact-area threshold Sc is set to a larger value than SB and to a smaller value than SA, and the main control unit 322 compares the contact area S detected by the touch panel 14 being the turn-over detector 335 with the contact-area threshold Sc. The main control unit 322 determines that the user is looking at the first display surface 42 when S>Sc holds, and determines that the user is looking at the second display surface 44 when S≤Sc hold.

When the touch panel 14 is used as the turn-over detector 335, the screen the user is looking at can be determined regardless of whether the housing 2 faces upward. This enables the screen the user is looking at to be determined, for example, even when the user is using the mobile electronic device 301 in a state lying down or even when the user is using the mobile electronic device 301 in zero-gravity space.

At Step S203, when it is determined that S>Sc holds (Yes at Step S203), the main control unit 322 can determine that the user is looking at the first display surface 42. In this case, the process proceeds to Step S204, and the main control unit 322 displays an image on the first display surface 42 and sets the physical keys to the enabled state. When it is determined that S≤Sc holds (No at Step S203), the main control unit 322 can determine that the user is looking at the second display surface 44. In this case, the process proceeds to Step S205, and the main control unit 322 displays an image on the second display surface 44 and sets the touch panel 14 to the enabled state.

After Step S204 or Step S205 is ended, the process proceeds to Step S206. At Step S206, the main control unit 322 determines whether the housing 2 of the mobile electronic device 301 has been turned over, from the detection result of the touch panel 14 being the turn-over detector 335. For example, when the detection result of the touch panel 14 has changed from S>Sc to S≤Sc or from S≤Sc to S>Sc, the main control unit 322 determines that the housing 2 has been turned over.

When the main control unit 322 determines that the housing 2 has been turned over (Yes at Step S206), the process proceeds to Step S207, and the main control unit 322 switches between the displays and switches between the inputs. When the main control unit 322 determines that the housing 2 has not been turned over (Not Step S206), the process proceeds to Step S208, and the main control unit 322 maintains its current status. The screens used to display images can be switched to one another by the turn-over of the housing 2 according to the above procedure.

(Screen Switching Example 3)

Figure 29:
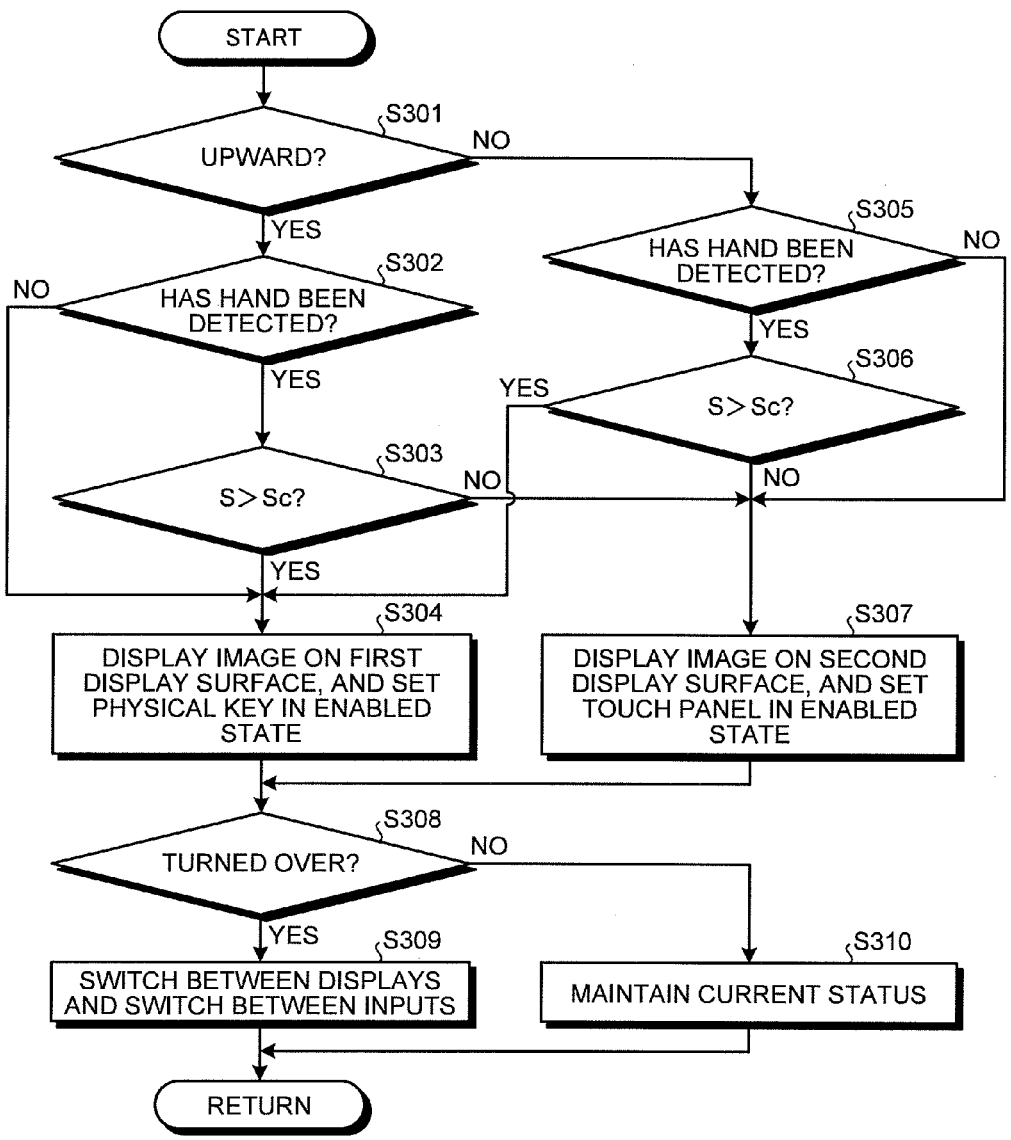
FIG. 29 is a flowchart of a third method for switching between screens displaying images using the mobile electronic device according to the embodiment.

FIG. 29 is a flowchart of a third method for switching between screens displaying images using the mobile electronic device according to the present embodiment. In the third method, an acceleration sensor and the touch panel 14 are used for the turn-over detector 335. Upon executing the screen switching example 3, at Step S301, the main control unit 322 of the mobile electronic device 301 illustrated in FIG. 24 determines whether the housing 2 of the mobile electronic device 301 faces upward, from the detection result of the acceleration sensor. When the main control unit 322 determines that the housing 2 faces upward (Yes at Step S301), the process proceeds to Step S302.

At Step S302, the main control unit 322 determines whether the user's hand has been detected, from the detection result of the touch panel 14. When the main control unit 322 determines that the hand has been detected (Yes at Step S302), the process proceeds to Step S303, and the main control unit 322 calculates an area (contact area) S of the hand in contact with the touch panel 14 and compares the calculated area with the predefined contact-area threshold Sc. This method is the same as that of the screen switching example 2.

When it is determined that S>Sc (Yes at Step S303), the main control unit 322 can determine that the user is looking at the first display surface 42. In this case, the process proceeds to Step S304, and the main control unit 322 displays an image on the first display surface 42 and sets the physical keys to the enabled state. When it is determined that S≤Sc (No at Step S303), the main control unit 322 can determine that the user is looking at the second display surface 44. In this case, the process proceeds to Step S307, and the main control unit 322 displays an image on the second display surface 44 and sets the touch panel 14 to the enabled state.

Referring back to Step S302, when it is determined that the hand has not been detected (No at Step S302), the main control unit 322 can determine that the user does not touch the mobile electronic device 301, the housing 2 faces upward, and that the first display surface 42 faces upward. In this case, the process proceeds to Step S304, and the main control unit 322 displays an image on the first display surface 42 and sets the physical keys to the enabled state.

Referring back to Step S301, when the main control unit 322 determines that the housing 2 does not face upward, that is, faces downward (No at Step S301), the process proceeds to Step S305. At Step S305, the main control unit 322 determines whether the user's hand has been detected, from the detection result of the touch panel 14. When the main control unit 322 determines that the hand has been detected (Yes at Step S305), the process proceeds to Step S306, and the main control unit 322 calculates an area (contact area) S of the hand in contact with the touch panel 14 and compares the calculated area with the predefined contact-area threshold Sc. This method is the same as that of the screen switching example 2.

When it is determined that S>Sc (Yes at Step S306), the main control unit 322 can determine that the user is looking at the first display surface 42 while the housing 2 faces downward, that is, the first display surface 42 is directed to the acting direction of gravity. For example, this case is such that the user is using the mobile electronic device 301 in a state lying down. In this case, the process proceeds to Step S304, and the main control unit 322 displays an image on the first display surface 42 and sets the physical keys to the enabled state. When it is determined that S≤Sc (No at Step S306), the main control unit 322 can determine that the user is looking at the second display surface 44 while the first display surface 42 is directed to the acting direction of gravity. In this case, the process proceeds to Step S307, and the main control unit 322 displays an image on the second display surface 44 and sets the touch panel 14 to the enabled state.

Referring back to Step S305, when it is determined that the hand has not been detected (No at Step S305), the main control unit 322 can determine that the user does not touch the mobile electronic device 301, the housing 2 faces downward, and that the second display surface 44 faces upward. In this case, the process proceeds to Step S307, and the main control unit 322 displays an image on the second display surface 44 and sets the touch panel to the enabled state. After Step S304 or Step S307 is ended, the process proceeds to Step S308. Step S308 to Step S310 are the same as Step S104 to Step S106 and Step S206 to Step S208.

It is not possible to distinguish, only by the acceleration sensor, the case where the housing 2 of the mobile electronic device 301 faces downward, that is, where the user is looking at the first display surface 42 while the first display surface 42 is directed to the acting direction of gravity (for example, the user is using the mobile electronic device 301 in a state lying down). In addition, only by the touch panel 14, it is not possible to distinguish the screen the user is looking at unless the user touches the touch panel 14. For example, if the user uses the mobile electronic device 301 placed on a desk or if the user uses it by holding the side of the housing 2, it is not possible to distinguish the screen the user is looking at. In the third method, the acceleration sensor and the touch panel 14 are used as the turn-over detector 335, and therefore the screen which the user is looking at can be distinguished between when the housing 2 faces upward and when the housing 2 faces downward. That is, the screen which the user is looking at can be distinguished regardless of any attitude of the housing 2 of the mobile electronic device 301. As a result, the precision to distinguish the screen which the user looking at is improved, thus further improving the convenience of the mobile electronic device 301.

Figure 30:
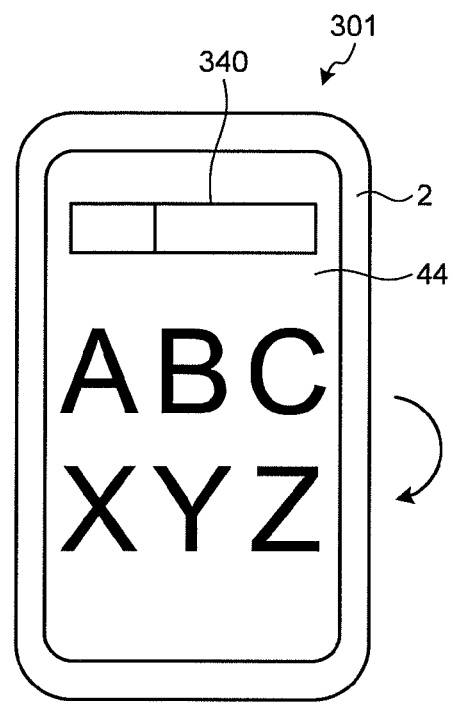
FIG. 30 is an explanatory diagram of an example of switching a display between a first display surface and a second display surface when a housing is turned over while the mobile electronic device is displaying an image.
Figure 31:
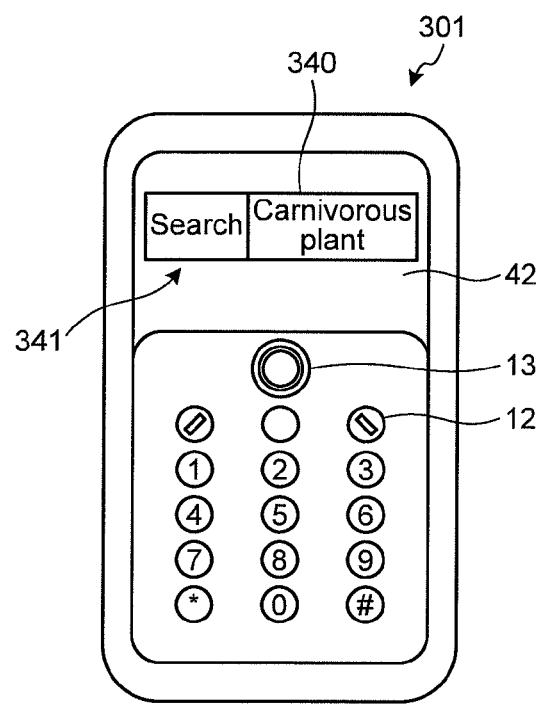
FIG. 31 is an explanatory diagram of an example of switching a display between the first display surface and the second display surface when the housing is turned over while the mobile electronic device is displaying an image.

FIG. 30 to FIG. 33 are explanatory diagrams of examples of how to switch the display between the first display surface and the second display surface when the housing is turned over while the mobile electronic device is displaying an image. FIG. 30 represents an example of displaying a Web browsing image on the second display surface 44 of the mobile electronic device 301. FIG. 31 represents an example of displaying a search input image 341 on the first display surface 42 of the mobile electronic device 301. The search input image 341 is an image having a text box (input area of textual information and numerical information) 340, and the text box 340 is an image requiring an input through the physical keys (the numeric keypad 12 and the direction and decision key 13).

In this way, an image appropriate for a large screen display, for example, a Web browsing image, a map (MAP) image, or an image or so photographed by the camera 36 illustrated in FIG. 1 and FIG. 24 is preferably displayed on the second display surface 44. This is because such an image generally contains a large amount of information and therefore displaying the image on a screen as large as possible is made more visible. Thus, the main control unit 322 preferably displays at least one of the Web browsing image, the map (MAP) image, and the image photographed by the camera 36 illustrated in FIG. 1 and FIG. 24 on the second display surface 44.

Meanwhile, in the mobile electronic device 301, because the first display surface 42 and the physical keys are provided on the same face of the housing 2, when an image is to be displayed on the first display surface 42, displaying an image related to a use of the physical keys is more preferred because of improvement of the usability of the physical keys. The image related to the use of the physical keys is an image requiring an input through the physical keys, such as the text box 340 and an image (search input image 341) including the text box 340. In this manner, it is preferable that the main control unit 322 displays an image appropriate for large screen display on the second display surface 44 and displays an image related to the use of the physical keys on the first display surface 42. This enables the usability of the mobile electronic device 301 to be more improved, thus reducing the stress the user feels during using the mobile electronic device 301.

FIG. 30 represents a state of displaying a Web browsing image including the text box 340 used for search input on the second display surface 44 of the mobile electronic device 301. When the housing 2 in this state is turned over and the turn-over detector 335 in FIG. 24 detects the turn-over of the housing 2, as illustrated in FIG. 31, the main control unit 322 displays the search input image 341 including the text box 340 used for search input on the first display surface 42, based on the detection result of the turn-over detector 335. At this time, the main control unit 322 in FIG. 24 sets the physical keys to the enabled state. In addition, the main control unit 322 preferably displays an enlarged area including the text box 340. This enables characters and numbers input to the text box 340 to be made more visible, which makes it easier to input them to the text box 340. Specifically, when a WEB page described in HTML language is displayed on the second display surface 44, and if the turn-over detector 335 detects the turn-over of the housing 2, the main control unit 322 determines whether an HTML tag indicating the text box 340 for input of a search word is included in the displayed WEB page. When it is determined that the HTML tag indicating the text box 340 is included therein, the main control unit 322 displays a screen with the text box 340 at its center on the first display surface 42.

Figure 32:
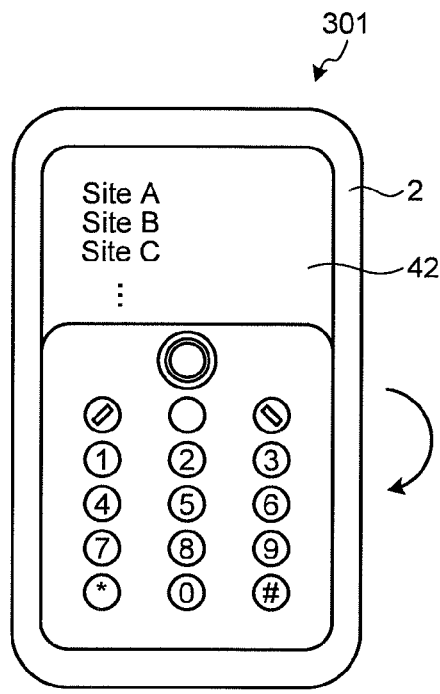
FIG. 32 is an explanatory diagram of an example of switching a display between the first display surface and the second display surface when the housing is turned over while the mobile electronic device is displaying an image.
Figure 33:
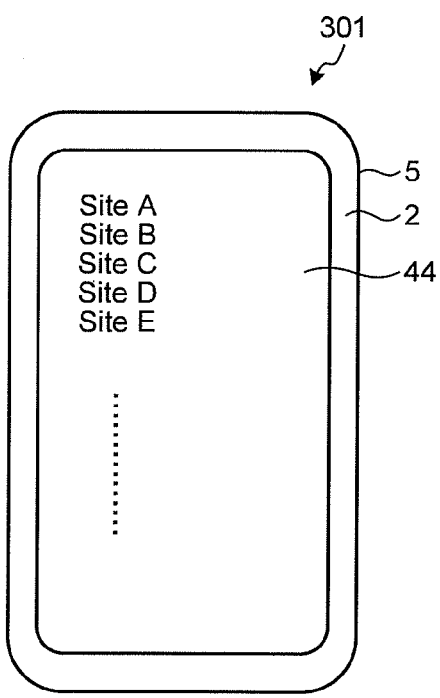
FIG. 33 is an explanatory diagram of an example of switching a display between the first display surface and the second display surface when the housing is turned over while the mobile electronic device is displaying an image.

Text desired to be searched is input to the text box 340 and is searched, and then the result thereof is displayed on the first display surface 42 as illustrated in FIG. 32. Because the first display surface 42 has a smaller area than that of the second display surface 44, the second display surface 44 is more preferable for displaying a search result image including much information. In this case, when the housing 2 of the mobile electronic device 301 is turned over, the turn-over detector 335 illustrated in FIG. 24 detects the turn-over. As illustrated in FIG. 33, the main control unit 322 displays the search result image, which have been displayed so far on the first display surface 42, on the second display surface 44 based on the detection result of the turn-over detector 335. The search result image is thereby displayed on the second display surface 44 having a larger area, and therefore the user can check more information on one screen, thus suppressing the use of scrolling or the like. As a result, the mobile electronic device 301 can further reduce the stress given to the user. The search result image may be displayed on the second display surface 44 in the following manner. First, the user inputs a keyword used for a search to the text box 340 using the physical keys while displaying the search input image 341 including the text box 340 used for search input on the first display surface 42. When the housing 2 is turned over by the user after the input of the keyword to the text box 340, the main control unit 322 starts the search and displays, after the end of the search, the search result on the second display surface 44. That is, the main control unit 322 starts the search triggered by the turn-over of the housing 2, and displays the search result after the end of the search on the second display surface 44. By doing in this way, the search is started without pressing a search button (a key set in the physical keys, an input detection area displayed on the second display surface 44, or the like) and the search result is displayed on the second display surface 44, thus further improving the usability of the mobile electronic device 301.

In the present embodiment, the mobile electronic device 301 is provided with the touch panel 14 on the second display surface 44 side, as illustrated in FIG. 5; however, from such a reason that the touch panel 14 is slow to response as compared with the physical keys, an input to the text box 340 is generally more difficult. In this case, when the user who desires to perform an input using the physical keys turns over the housing 2 in order to use the physical keys, then the text box 340 of images displayed on the second display surface 44 is displayed on the first display surface 42. In this way, an image requiring an input using the physical keys is displayed on the first display surface 42 together with the use of the physical keys, thus improving the usability of the mobile electronic device 301. In addition, an area including an image (text box 340 in the present embodiment) requiring an input using the physical keys is enlarged for display, and text or so is more easily input. Furthermore, when the user wants to see information that cannot be displayed on the first display surface 42, the user turns over the housing 2 and only directs the second display surface 44, which is larger, toward himself/herself, so that the user can check the information that cannot be displayed thereon, on the second display surface 44. In this manner, the mobile electronic device 301 can switch between displays on the screens with a simple operation following user's intuition, and therefore it is easy for the user to operate.

Figure 34:
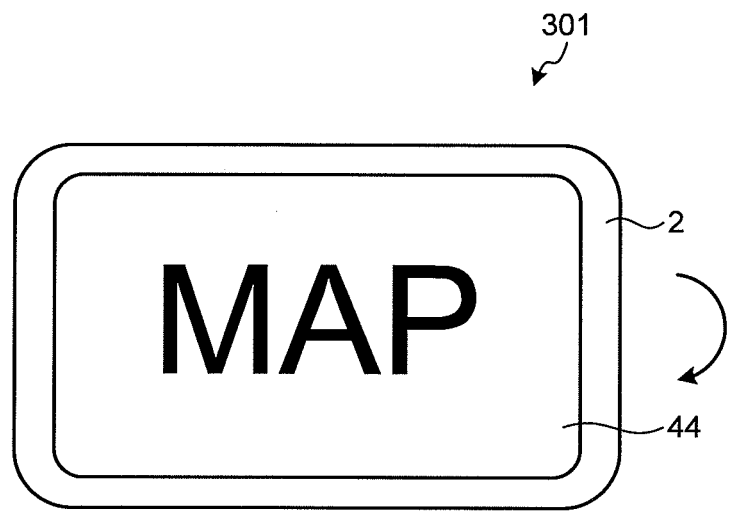
FIG. 34 is an explanatory diagram of an example of switching a display between the first display surface and the second display surface when the housing is turned over while the mobile electronic device is displaying an image.
Figure 35:
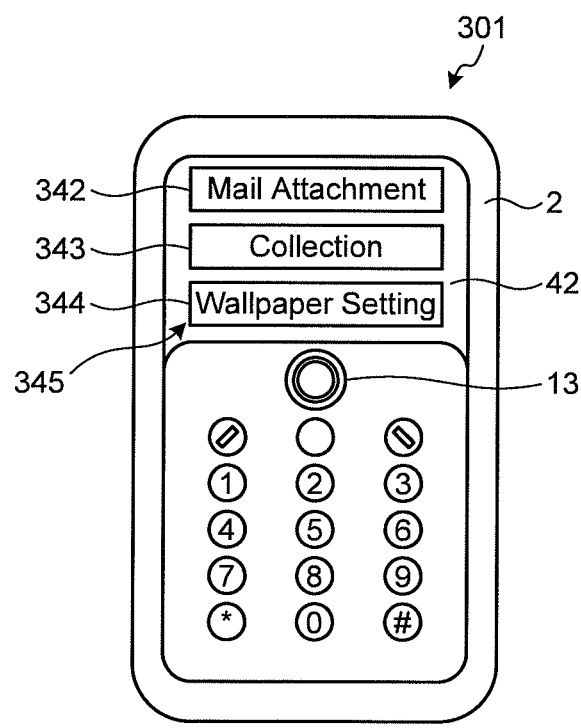
FIG. 35 is an explanatory diagram of an example of switching a display between the first display surface and the second display surface when the housing is turned over while the mobile electronic device is displaying an image.
Figure 36:
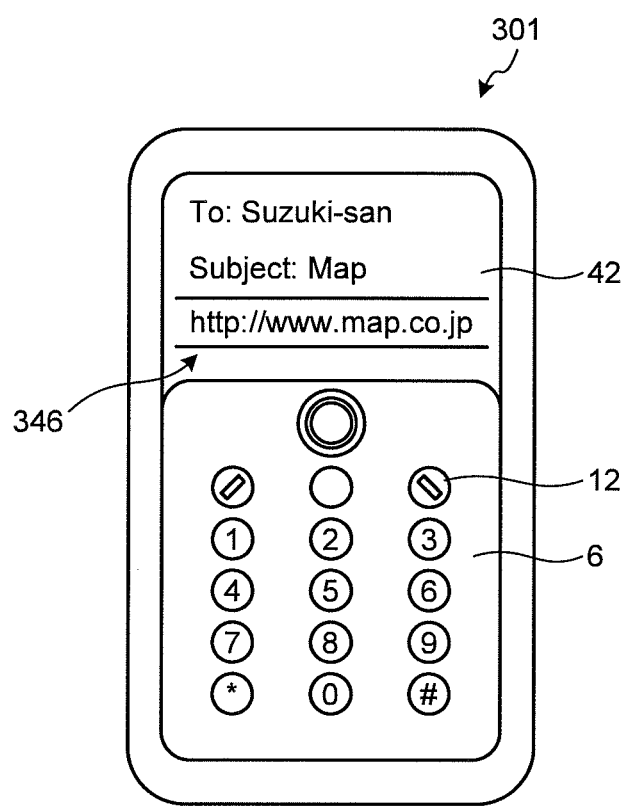
FIG. 36 is an explanatory diagram of an example of switching a display between the first display surface and the second display surface when the housing is turned over while the mobile electronic device is displaying an image.

FIG. 34 to FIG. 36 are explanatory diagrams of examples of switching a display between the first display surface and the second display surface when the housing is turned over while the mobile electronic device is displaying an image. FIG. 34 represents a state that the main control unit 322 in FIG. 24 displays a map image on the second display surface 44 of the mobile electronic device 301. When the housing 2 in this state is tuned over, the main control unit 322 displays a menu image 345 to activate a predetermined application on the first display surface 42 of the mobile electronic device 301. In this example, the menu image 345 includes a mail attachment menu 342, a collection menu 343, and a wallpaper setting menu 344. When each of the menus is selected, the main control unit 322 activates an application corresponding to the selected menu. For example, when the collection menu 343 is selected, the main control unit 322 activates collection software and stores a URL of an image currently displayed on the second display surface 44 in a predetermined area of the storage unit 24 in FIG. 24. When the wallpaper setting menu 344 is selected, the main control unit 322 activates wallpaper selection software, downloads an image currently displayed on the second display surface 44 to the storage unit 24, and sets the image as wallpaper of the first display surface 42 or the second display surface 44.

The user selects a menu desired to be executed using the direction and decision key 13 as the physical key. The main control unit 322 activates the application corresponding to the selected menu. For example, when the mail attachment menu 342 is selected, the main control unit 322 activates mail attachment software, displays a mail transmission image 346 on the first display surface 42, and attaches the URL of the image currently displayed on the second display surface 44 to a mail, as illustrated in FIG. 36. The user inputs a mail destination and a mail subject to the mail using the numeric keypad 12 as the physical keys and transmits the mail. In this way, when the turn-over detector 335 detects the turn-over of the housing 2 during the display using the second display surface 44, the main control unit 322 displays the menu image 345 to activate a predetermined application on the first display surface 42, thus improving the usability of the mobile electronic device 301.

Menus to be displayed on the menu image 345 may be freely set by the user. Thereby the menu to be displayed can be changed according to a user's use mode, thus improving the usability for the user. Moreover, when the housing 2 is turned over during the display using the second display surface 44, the main control unit 322 may activate a predetermined application. For example, when the housing 2 is turned over during the display using the second display surface 44, the main control unit 322 may activate software for mail attachment and attach the URL and image data of the image displayed on the second display surface 44 to the mail. Thereby steps to activate the software for the mail attachment can be saved, thus further improving the usability of the mobile electronic device 301. In this manner, the turn-over of the housing 2 during the display using the second display surface 44 and the activation of the predetermined application may be associated with each other. This enables the software frequently used by the user to be activated when an image is displayed on the second display surface 44, triggered by the turn-over of the housing 2, and therefore the steps to activate software can be reduced and the usability of the mobile electronic device 301 can further be improved.

It should be noted that the present invention is not limited to the embodiments, and therefore various configurations can be implemented. It goes without saying that all the embodiments of the present invention may be implemented in combination with each other.

INDUSTRIAL APPLICABILITY

As explained above, the mobile electronic device according to the present invention is useful in the case of using the mobile electronic device displaying an image thereon.

The invention claimed is:

1. A mobile electronic device comprising:
a housing of a transparent material, the housing having an outer shape comprising a first main face and a second main face;
a display unit arranged inside the housing and configured to display images on both surfaces on the first main face side and the second main face side, the display unit including an image display area that is transparent when no image is displayed thereon;
a physical key of an opaque or translucent material, the physical key being arranged on the first main face of the housing;
a circuit component arranged between the physical key and the display unit and including a control unit configured to receive an input from the physical key, control the display unit, and display an image based on at least one of length, angle, and orientation of the image display area of the display unit;
a location-information acquiring unit configured to acquire location information; and
a direction specifying unit configured to specify a direction of the housing, wherein
the control unit is configured to display information on surroundings of the mobile electronic device located on a rear face side of the image display area in the image display area based on the location information acquired by the location-information acquiring unit and the direction specified by the direction specifying unit.

2. The mobile electronic device according to claim 1, wherein a surface of the physical key is covered with a sheet member.

3. The mobile electronic device according to claim 2, further comprising:
a speaker;
a microphone; and
a camera, wherein
a portion of at least one of the speaker, the microphone, the camera exposed from the housing is disposed between the display unit and the sheet member.

4. The mobile electronic device according to claim 1, wherein
the control unit controls the display unit such that, an image is displayed on the second main face side of the display unit, a background of an area that faces the circuit component is opaque and a background of an area that does not face the circuit component is transparent.

5. The mobile electronic device according to claim 1, wherein
the physical key is arranged closer to a lower side of the first main face based on a character display orientation when a character is displayed on the first main face side.

6. The mobile electronic device according to claim 1, further comprising
a touch sensor that is provided in the second main face and receives an input of an operation, wherein
the physical key is provided with at least one of a trackball, a direction key, a touch pad, and an optical pointing device.

7. The mobile electronic device according to claim 1, further comprising
a wireless communication unit that is provided with an antenna that transmits and receives radio waves and is configured to externally acquire information to be displayed on a screen, wherein
the antenna is disposed between the physical key and the display unit and at an edge in a lower side based on a character display orientation.

8. The mobile electronic device according to claim 1, wherein
the display unit has an image display area of the second main face larger than an image display area of the first main face.

9. The mobile electronic device according to claim 1, wherein
the display unit is made transparent or translucent when an image is not displayed thereon.

10. The mobile electronic device according to claim 1, further comprising
a power source that is disposed between the physical key and the display unit and can be charged in a noncontact manner.

11. The mobile electronic device according to claim 1, wherein the control unit displays a ruler image in the image display area.

12. The mobile electronic device according to claim 1, wherein
the control unit stores a measurement result input when the ruler is displayed, and displays the input measurement result together with the ruler image therein.

13. A mobile electronic device, comprising:
a housing of a transparent material, the housing having an outer shape comprising a first main face and a second main face;
a display unit arranged inside the housing and configured to display images on both surfaces on the first main face side and the second main face side, the display unit including an image display area that is transparent when no image is displayed thereon;
a physical key of an opaque or translucent material, the physical key being arranged on the first main face of the housing; and
a circuit component arranged between the physical key and the display unit and including a control unit configured to receive an input from the physical key, control the display unit, and display an image based on at least one of length, angle, and orientation of the image display area of the display unit, wherein
when information on an actual size of a target object located on a rear face side of the image display area, which is visually recognizable by a user through the image display area and information on a size of the target object, as an image, that overlaps on the image display area are input, the control unit is configured to calculate a distance between the target object and the mobile electronic device based on these pieces of information.

14. A mobile electronic device, comprising:
a housing of a transparent material, the housing having an outer shape comprising a first main face and a second main face;
a display unit arranged inside the housing and configured to display images on both surfaces on the first main face side and the second main face side;
a physical key of an opaque or translucent material, the physical key being arranged on the first main face of the housing;
a circuit component arranged between the physical key and the display unit and including a control unit configured to receive an input from the physical key and control the display unit; and
a turn-over detecting unit configured to detect a turn-over of the housing, wherein
the display unit includes a first display surface configured to display a first image on the first main face and a second display surface configured to display a second image on the second main face, the second display surface having an area larger than that of the first display surface, and
the control unit is configured to switch between a display of the first image using the first display surface and a display of the second image using the second display surface according to a detection result of the turn-over detecting unit.

15. The mobile electronic device according to claim 14, wherein the control unit is configured to display an image related to a use of the physical key on the first display surface as the first image.

16. The mobile electronic device according to claim 14, wherein, when the turn-over detecting unit detects a turn-over of the housing during the display using the second display surface, the control unit is configured to display an image input to a text box on the first display surface as the first image.

17. The mobile electronic device according to claim 14, wherein, when the turn-over detecting unit detects a turn-over of the housing during the display using the second display surface, the control unit is configured to attach information displayed on the second display surface to an electronic mail.

18. The mobile electronic device according to claim 14, wherein, when the turn-over detecting unit detects a turn-over of the housing during the display using the second display surface, the control unit is configured to display a menu image for activating a predetermined application on the first display surface as the first image.

* * * * *